(12) United States Patent
Tanaka et al.

(10) Patent No.: US 8,009,310 B2
(45) Date of Patent: Aug. 30, 2011

(54) PRINT CONTROL PROGRAM, METHOD OF CONTROLLING PRINTING APPARATUS, AND PRINT CONTROL UNIT

(75) Inventors: Yoshiaki Tanaka, Kyoto (JP); Ryoji Murata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1059 days.

(21) Appl. No.: 11/419,532

(22) Filed: May 22, 2006

(65) Prior Publication Data

US 2006/0268304 A1    Nov. 30, 2006

(30) Foreign Application Priority Data

May 23, 2005   (JP) ................................. 2005-149646

(51) Int. Cl.
*G06F 3/12*    (2006.01)
(52) U.S. Cl. ............ 358/1.15; 358/1.13; 358/1.16; 358/1.1; 400/70; 400/71; 709/201; 709/202; 709/203; 710/6; 710/8
(58) Field of Classification Search ............ 358/1.13, 358/1.16, 1.1; 400/71, 70; 709/201, 202, 709/203; 710/6, 8
See application file for complete search history.

(56) References Cited

U.S. PATENT DOCUMENTS

| | | | |
|---|---|---|---|
| 5,287,194 A | | 2/1994 | Lobiondo |
| 6,813,037 B1 * | | 11/2004 | Collard ........................ 358/1.15 |
| 2002/0089691 A1 | | 7/2002 | Fertlitsch et al. |
| 2002/0145748 A1 * | | 10/2002 | Nonoyama et al. .......... 358/1.14 |
| 2004/0109176 A1 * | | 6/2004 | Osari ............................ 358/1.2 |
| 2004/0190042 A1 * | | 9/2004 | Ferlitsch et al. ............. 358/1.15 |
| 2004/0190057 A1 * | | 9/2004 | Takahashi et al. ........... 358/1.15 |

FOREIGN PATENT DOCUMENTS

| | | |
|---|---|---|
| JP | 2002-342055 | 10/1992 |
| JP | 2004-088573 | 3/2004 |
| JP | 2005-004251 | 1/2005 |
| JP | 2005-025308 | 1/2005 |

\* cited by examiner

*Primary Examiner* — Benny Tieu
*Assistant Examiner* — Martin Mushambo
(74) *Attorney, Agent, or Firm* — Renner, Otto, Boisselle & Sklar, LLP

(57) ABSTRACT

A print control program for controlling execution of a print job, the print job being shared among a main printing apparatus and one or more sub-printing apparatus(es), the print control program allowing a computer to function as:
  a print requesting section for requesting the main printing apparatus and the sub-printing apparatus(es) to execute the print job in a cooperative manner;
  an apparatus information acquiring section for acquiring information relating to printing capabilities of the respective printing apparatuses as apparatus information, the apparatus information being stored in the main printing apparatus in advance;
  an instruction determining section for determining shares of the print job assigned to the respective apparatuses based upon the acquired apparatus information; and
  a controlling section for generating control instructions to be transmitted to the respective apparatuses.

17 Claims, 19 Drawing Sheets

Fig.20

An Example of PJL for starting a print job

ESC%-12345X

@PJL JOB NAME="Printing apparatus.doc"

@PJL SET LONGINNAME="tanaka"

@PJL SET PASSWORD="XAEUWSITW"

@PJL SET DUPLEX=OFF

@PJL SET COPIES=5

@PJL SET MAX SLAVES=3

@PJL SET TANDEMPRINT=SLAVE3

@PJL ENTER LANGUAGE=PCL

PRINT CONTROL PROGRAM, METHOD OF CONTROLLING PRINTING APPARATUS, AND PRINT CONTROL UNIT

CROSS-REFERENCE TO RELATED APPLICATION

This application is related to Japanese Patent Application No. 2005-149646 filed on May 23, 2005, whose priority is claimed and the disclosure of which is incorporated by reference in its entirety.

BACKGROUND OF THE INVENTION

1. Field of the Invention

The present invention relates to a print control program, a controlling method of a printing apparatus, and a print control unit provided with the program.

2. Description of the Related Art

In recent years, a printing system having a tandem printing function by which a print job is shared to a plurality of printing apparatuses has been widely used so that the print job can be carried out in a short period of time. The tandem printing function is a function in which, for example, in an attempt to make a plurality of sets of copies as one copy job, the sets of copies are shared between a master (main printing apparatus) and a slave (sub-printing apparatus) and respective copying processes for each of the shared copies are carried out in parallel. Alternatively, in such a function, in an attempt to output a plurality of sets of prints as one printer job, the sets of prints are shared between a master and a slave and respective printing processes for each of the shared prints are carried out in parallel. In the above-mentioned printing system, the respective printing apparatuses are connected to each other with a one-to-one relationship, or connected to one another through a network.

In order to carry out the print job more efficiently, a technique for evaluating printing capabilities of the respective apparatuses and performing distributed processing depending on the printing capabilities has been disclosed (refer to Japanese Patent Application Laid-Open No. 2002-342055, for example).

Although the tandem printing function has been developed in order to carry out printing processes more efficiently, the conventional technique thereof has much to be improved so as to achieve more efficient processes. Here, the term "efficient process" is used in a broad sense and corresponds any of the printing process which enables a shortened printing period of time, reduced time-consuming tasks required for installing and setting a printing apparatus and a print control unit, reduced time-consuming tasks for recovery from a processing error or reduced time-consuming tasks required for the user to set conditions for a print job to be executed.

First, upon installing the printing apparatus and the print control unit, various setups for setting various pieces of information have been required in order to enable the tandem printing functions. Moreover, the information required for using the tandem printing functions for executing the printer job are set and held on the print control unit (host) side, and the information required for using the tandem printing functions for executing the copy job are set and held on the printing apparatus (multi function peripheral, MFP) side. This is because setups of the conditions for the printer job are conducted on the host side while the setups for the copy job are conducted on the MFP side without communicating with the host. This method is taken so that the information used for the setups of the conditions is easily acquired on the side at which the setup processes have been conducted. However, the information held on the host side and the information held on the MFP side result in overlapping considerably. System administrators who organize and supervise the printing system or installation service personnel usually set the above-mentioned pieces of information. Such personnel are subjected to heavy burden upon carrying out setups due to the overlapped pieces of information.

Moreover, after the setups have been made, the set pieces of information have to be updated according to a change in any connecting environment such as apparatuses and a network. Otherwise, in some cases, the effective processes in accordance with the respective apparatuses and with the structure of the network would not be achieved. In addition, without properly updating the information, a print job might be shared in such a manner that the master and the slave can not actually execute the shared print jobs. Upon request of such a shared print jobs, a processing error occurs. Consequently, the resulting problem is that the user has to conduct time-consuming tasks in solving the error.

SUMMARY OF THE INVENTION

The present invention is directed to solving the above-mentioned disadvantages and is designed to unify pieces of information required for tandem printing functions as apparatus information and to store the unified information in one printing apparatus. With this arrangement, an effective printing system is prepared. The present invention provides a print control program, print control unit or a controlling method that is applicable to such a system.

The present invention provides a print control program for controlling execution of a print job, the print job being shared among a main printing apparatus and one or more sub-printing apparatus(es), the main printing apparatus and one or more sub-printing apparatus(es) being connected to a computer through a communication line, the print control program allowing a computer to function as: a print requesting section for requesting the main printing apparatus and the sub-printing apparatus(es) to execute the print job in a cooperative manner; an apparatus information acquiring section for acquiring information relating to printing capabilities of the main printing apparatus and the sub-printing apparatus(es) as apparatus information, the apparatus information being stored in the main printing apparatus in advance; an instruction determining section for determining shares of the print job respectively assigned to the main printing apparatus and the sub-printing apparatus(es) based upon the acquired apparatus information; and a controlling section for generating control instructions to be transmitted to the main printing apparatus and the sub-printing apparatus(es) respectively, the control instructions respectively allowing communications between the computer and each of the main printing apparatus and the sub-printing apparatus(es), the control instructions being for controlling the execution of the print job.

Here, the print requesting section functions as a block that allows a user to conduct various setups relating to a print job through GUI and to click an execution button as a trigger for starting up the print job so that printing process are conducted in accordance with the setups for the print job. Further, the apparatus information is information required for setting a print job in each of the apparatuses upon executing a tandem printing process. The apparatus information may contain, for example, information relating to the print processing speed for each of the apparatuses. It may also contain information indicating a destination to be used upon transmitting a controlling command to each of the apparatus. Further, the apparatus information may contain structure information of optional devices for each of the apparatuses.

Moreover, in a different aspect, the present invention provides a method for executing a print job, the print job being shared among a main printing apparatus and one or more sub-printing apparatus(es), the main printing apparatus and one or more sub-printing apparatus(es) being connected to a computer through a communication line, the method including the steps of: requesting the main printing apparatus and the sub-printing apparatus(es) to execute the print job in a cooperative manner; acquiring information relating to printing capabilities of the main printing apparatus and the sub-printing apparatus(es) as apparatus information, the apparatus information being stored in the main printing apparatus in advance; determining shares of the print job respectively assigned to the main printing apparatus and the sub-printing apparatus(es) based upon the acquired apparatus information; generating control instructions, the control instructions respectively allowing communications between the print control unit and each of the main printing apparatus and the sub-printing apparatus(es), the control instructions being for controlling the execution of the print job; and transmitting the control instructions to the main printing apparatus and the sub-printing apparatus(es) respectively.

Moreover, the present invention provides a print control unit for execution of a print job, the print job being shared among a main printing apparatus and one or more sub-printing apparatus(es), the print control unit being connected to a main printing apparatus and one or more sub-printing apparatus(es) through a communication line, the print control unit comprising: a program storing section for storing a print control program for controlling the execution of the print job; a processing section for executing the stored print control program; and a communication section for allowing communication between the print control unit and each of the main printing apparatus and the sub-printing apparatus(es), wherein the print control program allows the processing section to function as: a print requesting section for requesting the main printing apparatus and the sub-printing apparatus(es) to execute the print job in a cooperative manner; an apparatus information acquiring section for acquiring information relating to printing capabilities of the main printing apparatus and the sub-printing apparatus(es) as apparatus information, the apparatus information being stored in the main printing apparatus in advance; an instruction determining section for determining shares of the print job respectively assigned to the main printing apparatus and the sub-printing apparatus(es) based upon the acquired apparatus information; and a controlling section for generating control instructions and causing the communication section to transmit the control instructions to the main printing apparatus and the sub-printing apparatus(es) respectively, the control instructions respectively allowing communications between the print control unit and each of the main printing apparatus and the sub-printing apparatus(es), the control instructions being for controlling the execution of the print job.

In another words, the present invention provides a print control unit that is provided with the above-mentioned print control program.

More particularly, the present invention provides a print control unit including the storing section used for storing the program, the processing section used for processing the stored program and the communication section used for communicating with the main printing apparatus and the sub-printing apparatus(es) in accordance with the processing of the program.

BRIEF DESCRIPTION OF THE DRAWINGS

FIG. 20 is an explanatory drawing that shows one example of PJL data to be transmitted from the communication driver 13 to the printer 2 or printer 3 of FIG. 1 upon starting a print job.

DETAILED DESCRIPTION OF THE PREFERRED EMBODIMENTS

Figure 1:
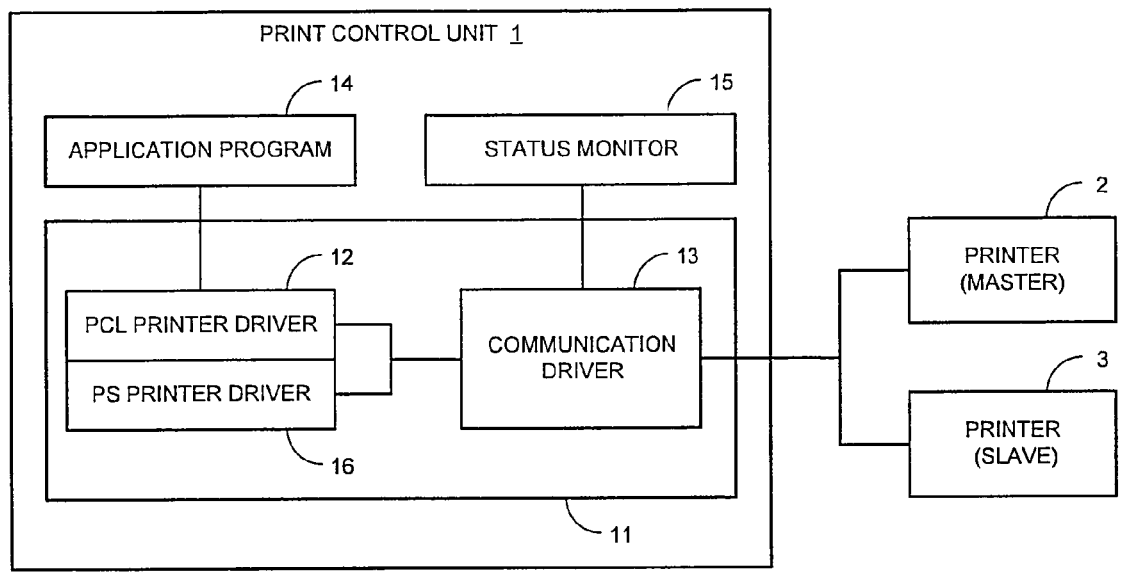
FIG. 1 is a block diagram showing a structure of a printing system constituted by a print control unit according to the present invention, a main printing apparatus, and a sub-printing apparatus.

Since the program of the present invention is provided with the apparatus information acquiring section for acquiring information relating to printing capabilities of the main printing apparatus and the sub-printing apparatus(es) as apparatus information, the apparatus information being stored in the main printing apparatus in advance, and the instruction determining section for determining shares of the print job respectively assigned to the main printing apparatus and the sub-printing apparatus(es) based upon the acquired apparatus information, the pieces of information required for enabling the tandem printing functions are preliminarily collected and stored in the main printing apparatus. Therefore, since tasks required for setting the pieces of information are reduced and since the pieces of information are collectively stored as the apparatus information, it is possible to prevent a mismatching from occurring due to failing to update one portion of information. Consequently, it is possible to avoid inefficient processes and occurrence of a processing error due to the mismatching in information updating, and consequently to achieve efficient printing processes.

Regarding the print control unit of the present invention, the control instruction to be transmitted to the main printing apparatus and the control instruction to be transmitted to the sub-printing apparatus(es) may have a format in common. This arrangement eliminates the necessity of conversion of the generated control instructions to respective formats depending on the apparatuses to communicate with, and thus simplifies the processes for the communication with the respective apparatuses. Thus, time required for the communication can be shortened.

Moreover, the control instruction to be transmitted to the main printing apparatus and the control instruction(s) to be transmitted to the sub-printing apparatus(es) may be each composed of a sequence of instructions including an instruction for printing preparation and may be transmitted thereto intermittently, and after the controlling section causes the communication section to transmit the instructions for printing preparation to the main printing apparatus and the sub-printing apparatus(es) respectively, the controlling section may cause the communication section to transmit succeeding instructions, included in the respective sequences of instructions, to the main printing apparatus and the sub-printing apparatus(es) respectively. With this arrangement, the instructions for printing preparation are transmitted to the main printing apparatus and the sub-printing apparatuses in the first place so that each of the apparatuses goes into a standby mode, the mode being ready for the start of printing; therefore, the time required for each of the apparatuses to start a printing process from the receipt of the succeeding instructions can be shortened so that an efficient printing process is achieved.

Each instruction for printing preparation may be an instruction that causes the main printing apparatus or the sub-printing apparatuses to return from a power saving mode to a printing standby mode, the instruction facilitating startup of the print job. Here, a considerable period of time is required for returning from the power saving mode; therefore, for example, the instructions for printing preparation are transmitted to the main printing apparatus and sub-printing apparatuses, and while the respective apparatuses are allowed to return from the power saving mode, other processes such as generation of print data can be conducted on the print control unit side. With this arrangement, each of the apparatuses is allowed to effectively utilize the time from the receipt of the print data to the start of the printing process, thereby making it possible to shorten the total time required for the printing process and consequently to achieve an effective printing process.

Moreover, the print job may be composed of a plurality of sets of prints, and the instruction determining section may determine the shares of the print job individually as one or more set(s) of prints. This arrangement makes it possible to eliminate the necessity of the user to set the shares of the print job, i.e. sets of prints to the respective apparatuses each time a print job is requested, and consequently to determine appropriate sets of prints based upon the apparatus information; thus, it becomes possible to reduce tasks required for the user to conduct setups. Consequently, it becomes possible to carry out an effective printing process by appropriately setting sets of prints.

Furthermore, the print job may be composed of a plurality of pages, and the instruction determining section may determine the shares of the print job individually as one or more page(s). This arrangement makes it possible to eliminate the necessity of the user to set the shares of the print job, i.e. numbers of pages to the respective apparatuses each time a print job is requested, and consequently to determine appropriate numbers of print pages based upon the apparatus information; thus, it becomes possible to reduce tasks required for the user to conduct setups. Consequently, it becomes possible to carry out an effective printing process by appropriately setting numbers of print pages.

The print control unit may further comprise an informing section for informing the user of a warning, wherein the main printing apparatus may modifiably store one or more destination(s) used in the transmission of the control instruction(s) to the sub-printing apparatus(es), the print requesting section may make a plurality of requests for the print job, the apparatus information acquiring section may further acquire the destination(s) from the main printing apparatus as apparatus information, each time the request for the print jobs are made, and when the acquired destination is modified from the destination acquired upon request for the previous print job, the informing section may inform that the destination is changed. With this arrangement, even upon modification of the destination(s) stored in the main printing apparatus, since the user is informed of the update of the instruction transfer end, the user is allowed to preliminarily know which sub-printing apparatus will output the corresponding print, and properly receive the output.

The apparatus information acquiring section may acquire information required for calculation of a ratio of the shares of the print job respectively assigned to the main printing apparatus and the sub-printing apparatus(es), and the instruction determining section may calculate the ratio based upon the acquired information and may determine, in accordance with the calculated ratio, the shares of the print job assigned to the main printing apparatus and the sub-printing apparatus(es) respectively. With this arrangement, for example, even when the print processing speeds of the respective apparatuses are different, the apparatus information acquiring section acquires information used for calculating the ratio of the shares of the print job and the instruction determining section determines an appropriate ratio; therefore, it is possible to reduce tasks to be imposed on the user to properly set the ratio of the shares of the print job among the respective apparatuses, or to set an appropriate ratio so that an efficient printing process can be achieved.

Moreover, the print requesting section may request the main printing apparatus and the plurality of sub-printing apparatuses to execute the print job in a cooperative manner, the apparatus information acquiring section may acquire information required for calculation of a ratio of shares of the print job respectively assigned to the plurality of sub-printing apparatuses, and the instruction determining section may calculate the ratio based upon the acquired information and may determine, in accordance with the calculated ratio, the shares of the print job assigned to the plurality of sub-printing apparatuses. With this arrangement, in the case when there are a plurality of sub-printing apparatuses, since not only the ratio of the shares of the print job between the main printing apparatus and the sub-printing apparatuses is simply determined, but also ratios of the shares of the print job to the respective sub-printing apparatuses are determined individually, it is possible to shorten the print processing time, and consequently to achieve an efficient printing process.

Furthermore, the apparatus information acquiring section may acquire processing capabilities of the respective apparatuses as apparatus information. With this arrangement, print jobs directed to the respective apparatuses can be determined so as to achieve the most efficient processes in accordance with the capabilities of the respective apparatuses. Further, any print job that cannot be processed by a certain apparatus is confirmed so that the printing processes can be cooperative with the corresponding apparatus being excluded. Therefore, it becomes possible to omit tasks required for the user to properly set the distribution of print jobs to the respective apparatuses upon setting the print jobs, or to set an appropriate distribution so that an efficient printing process is achieved, or to avoid the problem that a print job that cannot be processed by a certain apparatus is erroneously assigned to the corresponding apparatus.

Here, the processing capability may correspond to a function of an optional device attached to each of the apparatuses. With this arrangement, for example, it becomes possible to prevent a function that needs an optional device not attached from being requested as a print job. Further, in the case when there is an apparatus to which an optional device required for a print job is not attached, it is possible to determine so that the print job is not assigned to the corresponding apparatus.

Moreover, the processing capability may correspond to a kind of printer language (PDL language) supported by each of the apparatuses. With this arrangement, in the case when, for example, the main printing apparatus supports PCL and PS languages, while the sub-printing apparatus only supports the PCL language, it is determined that a print job using the PS language should not be assigned to the sub-printing apparatus so as to be executed only by the main printing apparatus. Therefore, it becomes possible to prevent the occurrence of a failure in that a processing error occurs due to a print job that has been sent to the sub-printing apparatus without determining its processing capability.

Furthermore, the print control unit may further comprise: an authentication data inputting section for requesting a user to input authentication data used for allowing the main printing apparatus and the sub-printing apparatus(es) to execute the print job, and for allowing the user to input the authentication data; and an authentication data adding section for adding the input authentication data to the control instructions to be transmitted to the main printing apparatus and the sub-printing apparatus(es). With this arrangement, even in the case when different authentication data are required for the respective apparatuses to carry out the printing processes, since the authentication data corresponding to each of the apparatuses is added to the control instruction and transmitted thereto, the authentication procedures of each of the apparatuses are carried out by using the transmitted authentication data so that the corresponding printing process can be executed.

The print control unit may further comprise a structure information requesting section for allowing a user to request structure information relating to optional device(s) installed in each of the main printing apparatus and the sub-printing apparatus(es), wherein the main printing apparatus may modifiable store one or more destination(s) used in the transmission of the control instruction(s) to the sub-printing apparatus(es), and the apparatus information acquiring section further may acquire the structure information of the optional device(s) in response to the request from the structure information requesting section, and also may acquire the destination(s) to the sub-printing apparatus(es) from the main printing apparatus. With this arrangement, since the structure information of an optional device the setups of which are indispensably required is acquired together with the destination to the sub-printing apparatus, it becomes possible to reduce operation tasks required for the user to carry out the setups.

Moreover, the print controller may further comprise a status monitoring section for monitoring the status of each of the main printing apparatus and sub-printing apparatus(es), wherein the main printing apparatus may modifiably store one or more destination(s) used in the transmission of the control instruction(s) to the sub-printing apparatus(es), and the apparatus information acquiring section may further acquire the destination(s) to the sub-printing apparatus(es) from the main printing apparatus, and the status monitoring section may monitor the status of the sub-printing apparatus(es) corresponding to the acquired destination(s). With this arrangement, the status monitoring process can be carried out not only on the main printing apparatus, but also on the sub-printing apparatus so that it becomes possible to confirm whether or not the sub-printing apparatus is in a status capable of carrying out a tandem printing process.

After the request by the print requesting section for the print job, the status monitoring section may monitor the status of each of the main printing apparatus and the sub-printing apparatus(es) until the control instructions have been transmitted to the main printing apparatus and the sub-printing apparatus(es) respectively, and the controlling section may suspend the transmission of one of the control instructions to one of the main printing apparatus and sub-printing apparatus(es) when the apparatus has a trouble in conducting its share of the print job, and resumes the transmission after the restoration from the trouble. With this arrangement, prior to transmitting the control instructions for a print job, the status of each of the printing apparatuses is confirmed, and in the case when the status causes any problem in executing the print job, the user is allowed to select whether or not the print job should be continued, thereby making it possible to avoid executing an inefficient printing process. Thus, it is possible to improve the convenience for the user.

Moreover, the print control unit may further include an informing section used for informing the user of a warning with respect to the apparatus on which the transmission has been suspended. With this arrangement, the user is allowed to know the status of the apparatus so as to take countermeasures.

Alternatively, after the request for the print job by the print requesting section, the status monitoring section may monitor the status of each of the main printing apparatus and the sub-printing apparatus(es) until the control instructions have been transmitted to the main printing apparatus and the sub-printing apparatus(es) respectively, and the instruction determining section may determine to allow another one of the main printing apparatus and sub-printing apparatus(es) to conduct, in place of the apparatus which has a trouble, the share of the print job assigned to the apparatus which has a trouble, based upon the results of monitoring of each of the main printing apparatus and sub-printing apparatus(es). With this arrangement, prior to transmitting the control instructions for a print job, the status of each of the apparatuses is confirmed, and in the case when the status causes any problem in executing the print job, the print output is carried out by using any apparatus other than the corresponding apparatus, thereby making it possible to avoid executing an inefficient printing process. Thus, it is possible to improve the convenience for the user.

Moreover, the print control unit may further include an informing section used for informing the user of a warning with respect to the print job that has been substituted by another apparatus in its execution. With this arrangement, the user is allowed to know the status of the apparatus so as to take countermeasures.

The print control unit may be connected to the main printing apparatus and the sub-printing apparatuses through the communication line, the print control unit may further comprises a selection-prohibited apparatus specifying section for allowing a user to specify among the sub-printing apparatuses a sub-printing apparatus as a selection-prohibited apparatus, wherein the print requesting section may request the print job to the respective printing apparatuses except for the sub-printing apparatus specified as the selection-prohibited apparatus, the instruction determining section may determine shares of the print job assigned to the respective printing apparatuses except for the selection-prohibited apparatus, and the controlling section may generate the control instructions to be transmit the control instructions to the respective printing apparatuses except for the selection-prohibited apparatus. For example, in the case when the user determines that it would take too much time to pick up output prints because the number of the sub-printing apparatuses is too many, or in the case when the user determines that it would take too much time to pick up output prints because the corresponding sub-printing apparatus is far away, since the user can specify the sub-printing apparatus as the selection-prohibited apparatus to prohibit the execution of the print job by the specified sub-printing apparatus, it is possible to improve the convenience for the user.

Moreover, the selection-prohibited apparatus specifying section may allow a specific user to specify the sub-printing apparatus by user authentication. With this arrangement, by limiting the user who can specify the sub-printing apparatus, it is possible to prevent the specification of the sub-printing apparatus being erroneously altered. It is assumed that it is difficult for general users who are not familiar with the network and the structure of the apparatuses to appropriately specify the sub-printing apparatus; therefore, it is better to limit the authorization of the user capable of altering the specification of the sub-printing apparatus so as to provide smoother managing.

The control instructions to the respective apparatuses may include an identification instruction used for identifying the main printing apparatus or the sub-printing apparatus. With this arrangement, upon monitoring the status of each of the apparatuses, each of the apparatuses is allowed to return the identification information corresponding to the identification instruction so that it becomes possible to easily identify which apparatus has transmitted the specific status. For example, the main printing apparatus transmits an identification instruction with an identifier contained therein so that each of the apparatuses is allowed to return its status information together with the identifier; thus, it becomes possible to easily determine which apparatus has returned the status information.

Regarding the method for executing a print job of the present invention, the step of generating control instructions may be the step of generating a plurality of sequences of instructions, the sequences of instructions constituting the control instructions respectively, and the step of transmitting the control instructions may include the steps of: storing the generated instructions; transmitting the stored instructions in such a manner that the instructions of each sequence are successively transmitted while keeping track of how many instructions of each sequence having been transmitted.

Moreover, each of the steps may be carried out under a multitask environment in which one or more thread(s) are generated, assigned for carrying out the steps, and executed in a non-sequential manner, each control instruction may be composed of a sequences of instructions, the step of transmitting the control instructions to the main printing apparatus and the sub-printing apparatus(es) respectively may be carrying out within a plurality of threads, each thread being assigned to the respective apparatuses and executing transmission of the sequence of the instruction to the corresponding apparatus intermittently.

The following further describes the present invention in detail with reference to the drawings. The invention is fully illustrated by the following description, but is not intended to be limited thereby.

FIG. 1 is a block diagram that shows a structure of a printing system in accordance with the present invention, constituted by a print control unit, a main printing apparatus and a sub-printing apparatus. As shown in FIG. 1, the printing system relating to the present invention is constituted by a print control unit 1, a printer 2 serving as the main printing apparatus and a printer 3 serving as the sub-printing apparatus that are connected to one another. The physical connecting mode between the respective unit and apparatuses may be prepared as, for example, a network such as Ethernet; however, not limited by this, for example, USB and IEEE1394 connections may be used. The communication system through which the respective unit and apparatuses connected to the network are allowed to use, for example, a TCP/IP protocol; however, not limited to this, for example, another protocol such as a Token Ring protocol may be used. Although FIG. 1 shows an example in which a single sub-printing apparatus is used; however, a plurality of sub-printing apparatuses may be connected.

The printer 2 and printer 3 may be prepared as, for example, a MFP of an electrophotographic apparatus; however, not limited to this, for example, a MFP of an ink-jet system may be used. Moreover, any of the printing apparatuses may be a printer of a single function in which no image reading function is included. Here, the print control unit 1 may be, for example, a personal computer; however, not limited to this, a so-called work station or information terminal apparatus may be used.

The print control unit 1 includes an application program 14 used for forming information to be printed and a print control program 11 that controls a printing apparatus so as to allow the printers 2 and 3 to print the information formed by the application. Moreover, this may also include a status monitor 15 corresponding to a program that monitors the printing apparatus, and displays the status of the printing apparatus on the display section not shown, if necessary.

The print control program 11 is constituted by a printer driver and a communication driver 13. The printer driver generates a control command (in PJL or printer job language) to be transmitted to the printer depending on the kinds of PDL language supported by the printers 2 and 3. The communication driver 13 transmits the control command generated by the printer driver to the printer as well as activating a thread generated by the print data, and also receives information from the printer and passes the information to the printer driver and the status monitor 15. In FIG. 1, the printer driver is constituted by two kinds of printer drivers, that is, a PCL printer driver 12 used for a printer that supports the PCL language and a PS printer driver 16 used for a printer that supports the PS language.

The PCL printer driver 12, the PS printer driver 16, the communication driver 13, the application program 14 and the status monitor 15 function to execute independent tasks under a multi-task operating system environment provided by the print control unit 1. Moreover, each of the tasks generates a thread, if necessary, and each generated thread executes processes independently. One example of the multi-task operating system that the print control unit 1 provides is Windows (registered trademark); however, not limited to this, another operating system such as Mac OS or Linux (registered trademark) may be used.

The print requesting section, the apparatus information acquiring section and the command determining section of the present invention are achieved as one portion of the functions of the PCL printer driver 12 or the PS printer driver 16. Moreover, the main printing apparatus controlling section and the sub-printing apparatus controlling section are achieved as one portion of the functions of the communication driver 13. With respect to the hardware structure that achieves the present invention, for example, the print control unit 1 is prepared as a personal computer. The CPU of the personal computer executes the respective programs of the PCL printer driver 12, the PS printer driver 16, the communication driver 13, the application program 14 and the status monitor 15 so that the respective functions are achieved. The respective programs are stored in, for example, a hard disk drive installed in the personal computer. The stored program is transferred onto its RAM upon applying power to the personal computer, and the CPU executes processes corresponding to the contents thereof. Alternatively, each of the programs is supplied in a recorded state in a medium such as a CD and a DVD, and the contents of the medium may be read and transferred onto the RAM. Moreover, each of the programs may be stored in a memory element such as flash memory. Thus, the stored program may be directly fetched by the CPU, or may be once transferred onto the RAM so that the program on the RAM may be fetched by the CPU, and executed.

Figure 2A:
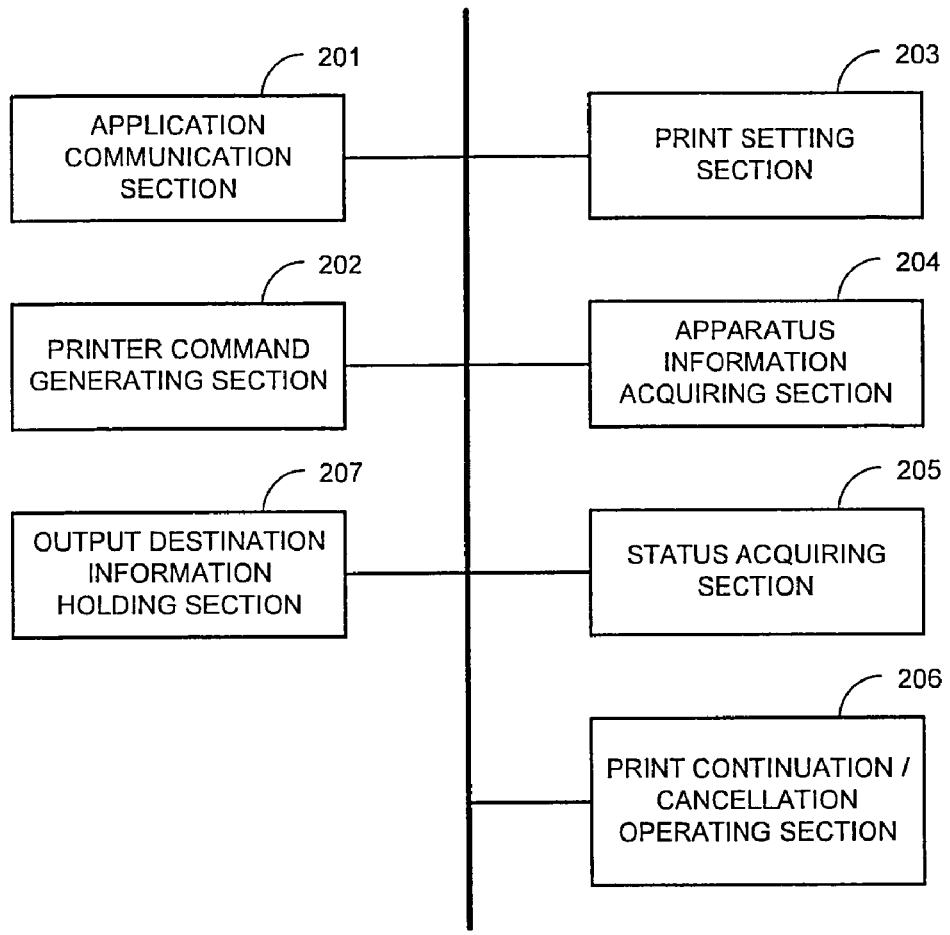
FIGS. 2A and 2B are block diagrams showing an inner structure of a PCL printer driver 12, a PS printer driver 16, and a communication driver 13 shown in FIG. 1.
Figure 2B:
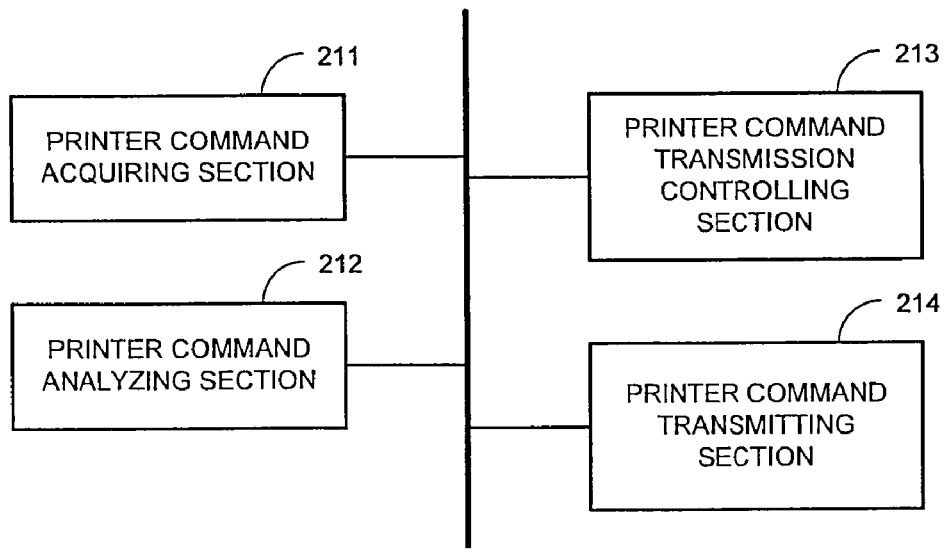

FIGS. 2A and 2B are block diagrams that shows an inner structure of the PCL printer driver 12, the PS printer driver 16 and the communication driver 13 shown in FIG. 1. FIG. 2A shows the inner structure of either the PCL printer driver 12 or the PS printer driver 16 selectively both of which have corresponding inner structures, and FIG. 2B is a block diagram that shows the inner structure of the communication driver 13.

As shown in FIG. 2A, each of the PCL printer driver 12 and the PS printer driver 16 is constituted by an application communication section 201, a printer driver print setting section 203, a apparatus information acquiring section 204, a status acquiring section 205, an output destination information holding section 207, a printer command generating section 202 and a print continuation/cancellation operating section 206. The application communication section 201 communicates with the application program 14. The printer driver print setting section 203 supplies GUI to the user by using the display screen, not shown, and the input section such as the keyboard and the mouse, of the print control unit 1. Moreover, the printer driver print setting section 203 allows the user to set print jobs to be executed, and also functions as a print requesting section. The apparatus information acquiring unit 204 acquires information relating to the printers 2 and 3 from the master printer 2. The status acquiring section 205, which monitors and acquires the status of each of the printers 2 and 3, is allowed to function as a status monitoring section. The output destination information holding section 207 holds the apparatus information of the printer that is the destination of the generated printer command. The printer command generating section 202 functions as a command determining unit that generates PJL that allows the printers 2 and 3 to print the print job requested by the print setting section 203. The print continuation/cancellation operating section 206 allows the user to continue/cancel the print job. Here, the print requesting section, the apparatus information acquiring section and the command determining section are essential constituent elements of the present invention.

The printer driver print setting section 203 may also include a function as an authentication data inputting section used for preliminarily inputting authentication data. Moreover, the printer driver print setting section 203 may also include a function as a structural information acquisition requesting section that allows the user to acquire the structural information of optional devices of the respective apparatuses.

As shown in FIG. 2B, the communication driver 13 is constituted by a printer command acquiring section 211, a printer command transmitting section 214, a printer command analyzing section 212, a printer command transmission controlling section 213. The printer command acquiring section 211 acquires a printer command generated by the PCL printer driver 12 or the PS printer driver 16. The printer command analyzing section 212 analyzes the contents of the acquired printer command, and transmits a printer command corresponding to the analyzed result. Moreover, the printer command analyzing unit 212 generates a thread used for generating print data for each of the printers. The printer command transmitting section 214 transmits the generated printer command to each of the printers. The printer command transmission controlling section 213 controls the progress of the communication sequence of the printer command successively transmitted to the printer, and functions as the main printing apparatus controlling section and one or more sub-printing apparatus controlling sections. Moreover, the printer command transmitting section 214 may include a function as an authentication data adding section that adds set authentication data to a printer command to be transmitted to the corresponding apparatus. Here, the main printing apparatus controlling section and at least one sub-printing apparatus controlling section are essential constituent elements of the present invention. The above is an explanation of the structure of the print control unit 1.

Figure 3:
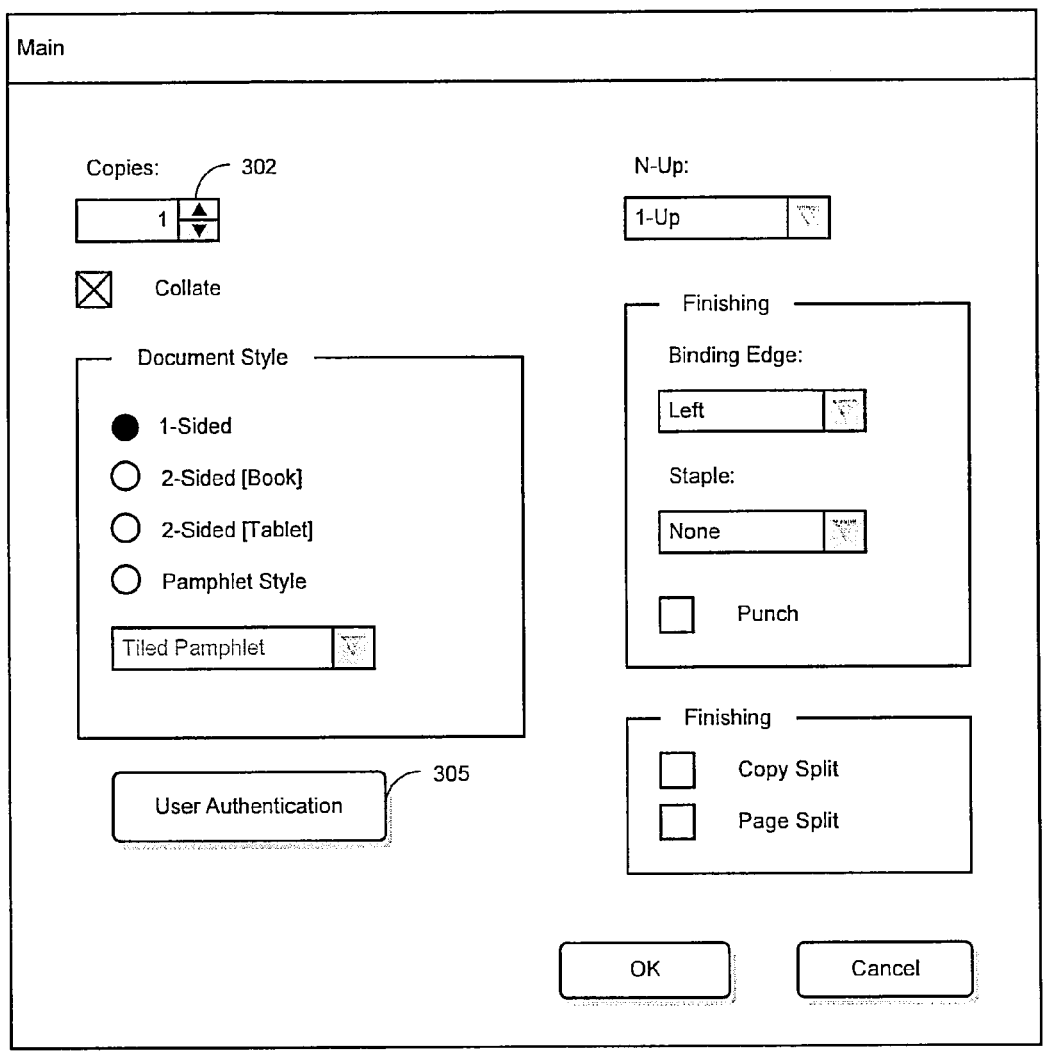
FIG. 3 is an explanatory drawing that shows one example of a function setting screen supplied by a print setting section 203 in FIG. 2A so as to allow the user to set a print job.
Figure 5:
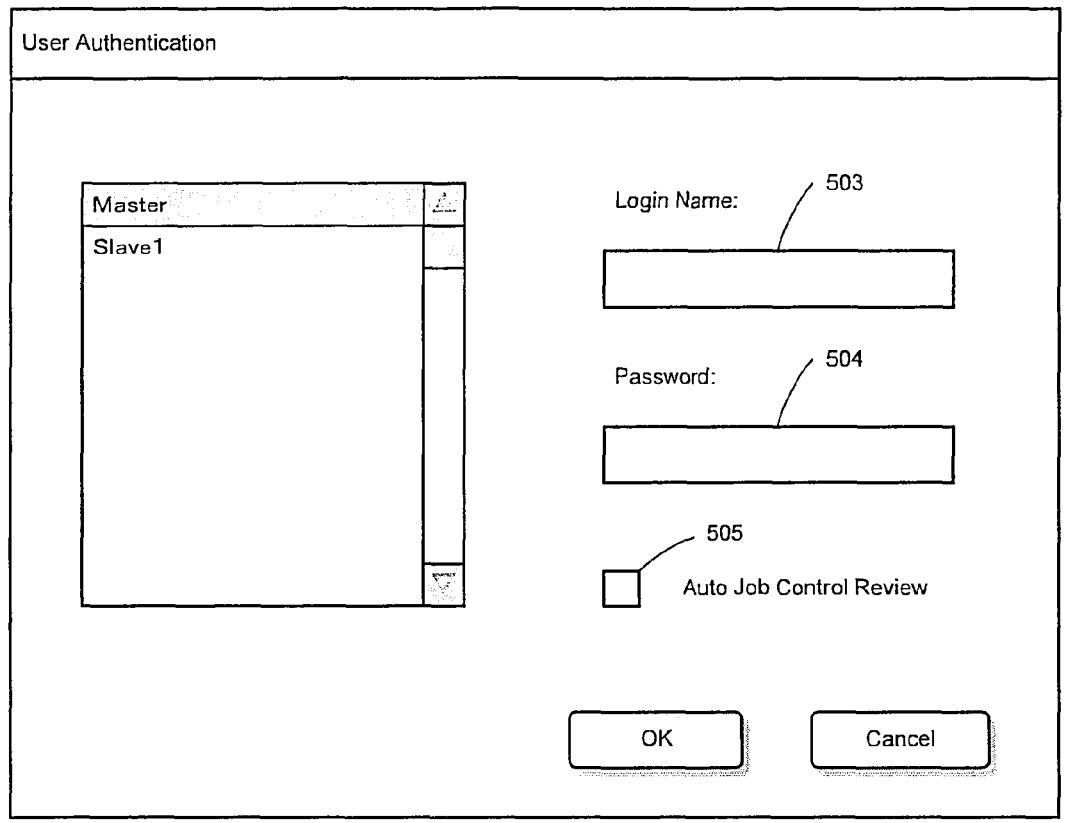
FIG. 5 is an explanatory drawing that shows one example of a setting screen that is displayed when a "User Authentication" button 305 is clicked on the function setting screen shown in FIG. 3.

FIG. 3 is an explanatory drawing that shows one example of a function setting screen to be supplied by the print setting section 203 of FIG. 2A serving as the authentication data inputting section so as to allow the user to set print jobs. Moreover, FIG. 5 is an explanatory drawing that shows one example of a setting screen that is displayed when a "User Authentication" button 305 is clicked on the function setting screen shown in FIG. 3. After having set the print jobs to be executed on the function setting screen of FIG. 3, the user clicks an "OK" button. Upon detection of the clicking of the "OK" button, the print setting section 203 requests the selected printer driver (for example, the PCL printer driver 12 in this explanation) to execute the print jobs. Upon receipt of the request, the PCL printer driver 12 carries out the starting process of the print jobs. The following description will discuss the sequence of processes of the print control program 11.

Figure 9:
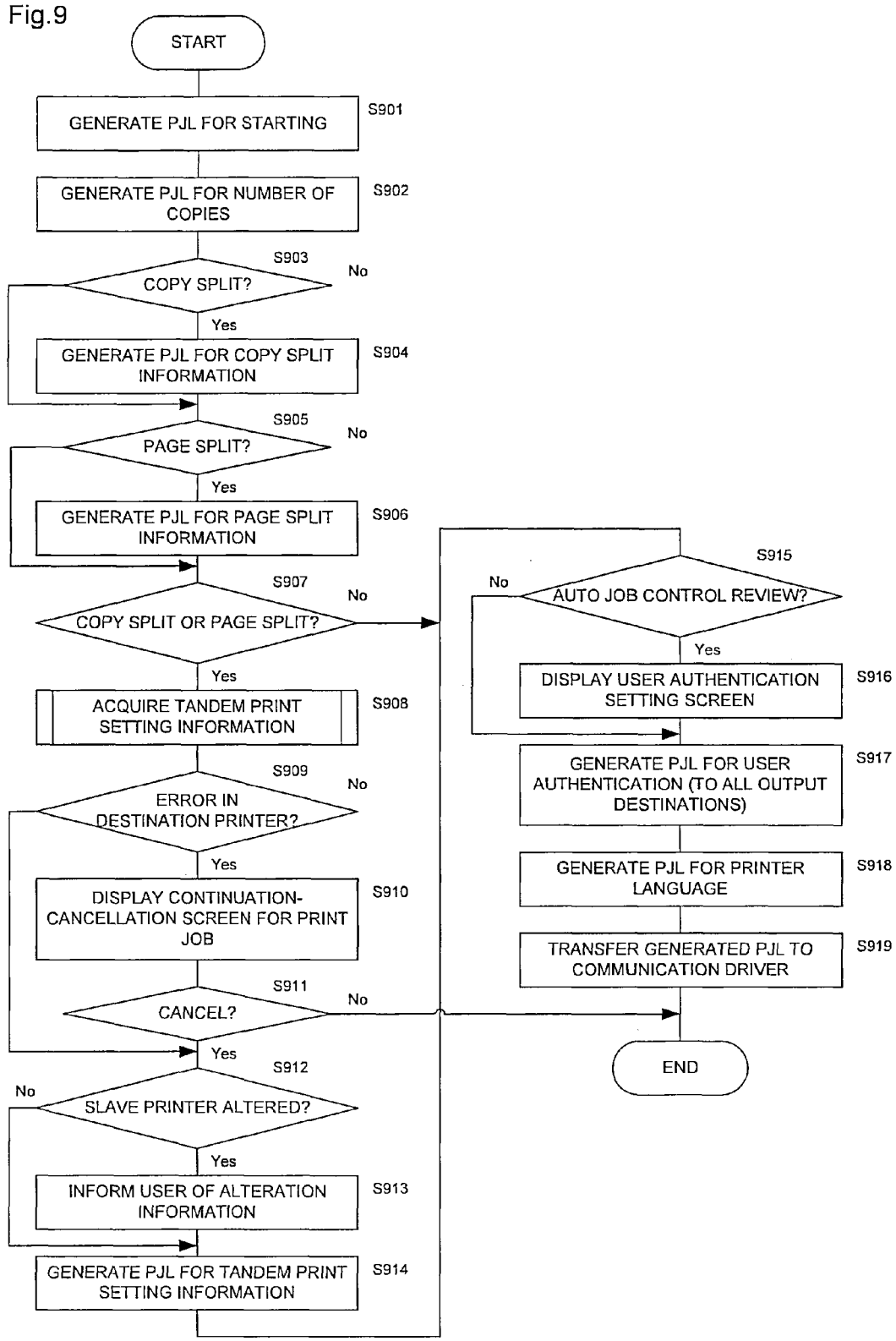
FIG. 9 is a flowchart that shows one example of a sequence of processes for starting a print job that are executed by the PCL printer driver 12 or the PS printer driver 16 in FIG. 1.

FIG. 9 is a flowchart that shows one example of a sequence of processes for starting the print job that are executed by the PCL printer driver 12 or the PS printer driver 16 in FIG. 1. Although the following explanation is given to the PCL printer driver 12, the same sequence of processes are applied to the PS printer driver 16 also. As shown in FIG. 9, the PCL printer driver 12 generates a control instruction (PJL) relating to the starting of the print job (step S901). The PJL, generated here, is a control instruction that the print control unit transmits so as to allow the printer to execute the print job. FIG. 20 is an explanatory drawing that shows one example of PJL data to be transmitted from the communication driver 13 to the printer 2 or printer 3 of FIG. 1 upon starting a print job. As shown in FIG. 20, the PJL is composed of a plurality of control instructions to be given to the printer. The instruction system is determined by a designer of the printer or a designer of the print control program. In this invention, the instruction systems of the main printing apparatus and the sub-printing apparatus are preferably set in common with each other.

Next, the PCL printer driver 12 generates PJL of the number of copies to be printed in the print job (step S902). Then, it is determined whether or not the number-of-copies splitting process has been set as the setting of the tandem printing operation (step S903). Here, the setting of the tandem printing operation corresponds to the setups carried out by the user in the screen of FIG. 3. In the case when the tandem printing operation has not been set, only the master printer 2 carries out the printing process; however, since the process in this case is not characterized by the present invention, the present embodiment will mainly exemplify the case in which the tandem printing operation is set. In the case when the above-mentioned determination indicates that the sets-of-copies splitting process has been set, the PCL printer driver 12 generates PJL of information of split sets of copies (step S904). Next, it is determined whether or not a page splitting process has been set (step S905). In the case when the page splitting process has been set, the PCL printer driver 12 generates PJL of page splitting information (step S906).

Here, neither the sets-of-copies splitting process nor the page splitting process has been set, the routine proceeds to step S915, which will be described later. In contrast, either the sets-of-copies splitting process or the page splitting process has been set, the routine proceeds to step S908. Information from the master printer 2 is acquired as apparatus information and information from the master printer 2 and the slave printer 3 relating to tandem printing processes is acquired as apparatus information. Moreover, the status of each of the printers 2 and 3 is acquired. Although these processes will be described later in detail, the process at step S908 realizes the functions of the apparatus information acquiring section 204 and the status acquiring section 205 of FIG. 2A.

Based upon the apparatus information and the status of the printer acquired at step S908, it is determined whether or not any of the printers is in an error state, or whether or not the structure of any of the printers might cause any inconsistency on the setups of the print job required (step S909). As a result, if the determination is made as having any error or inconsistency, the print continuation/cancellation operating section 206 of FIG. 2A displays a screen that allows the user to select the continuation or cancellation of the print job (step S910).

Figure 7A:
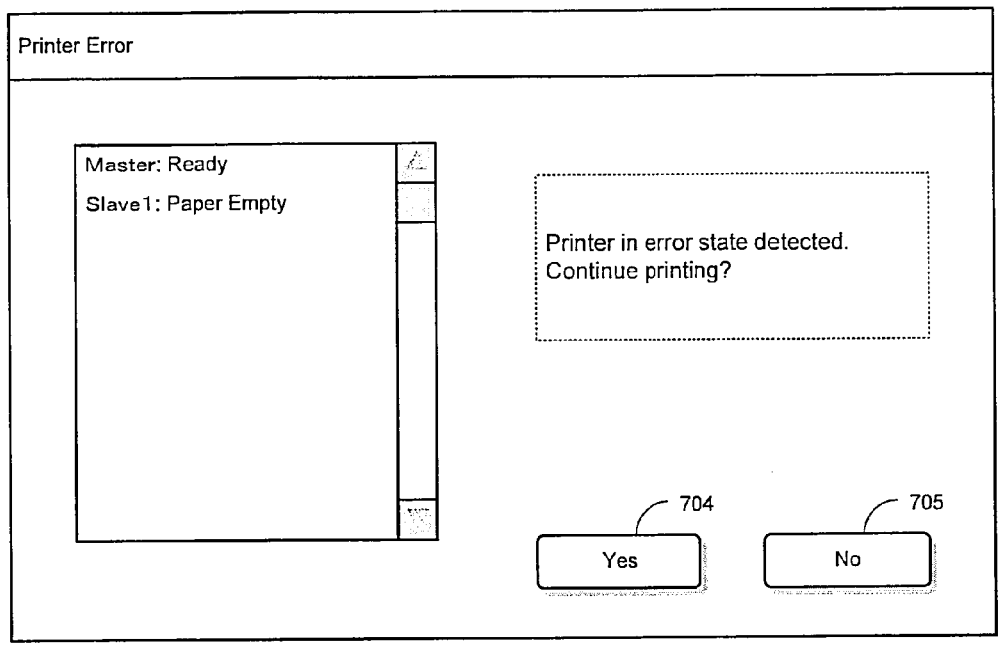
FIGS. 7A and 7B are explanatory drawings that show one example of an error warning screen to be displayed by the print continuation/cancellation operating section 206 of FIG. 2A.
Figure 7B:
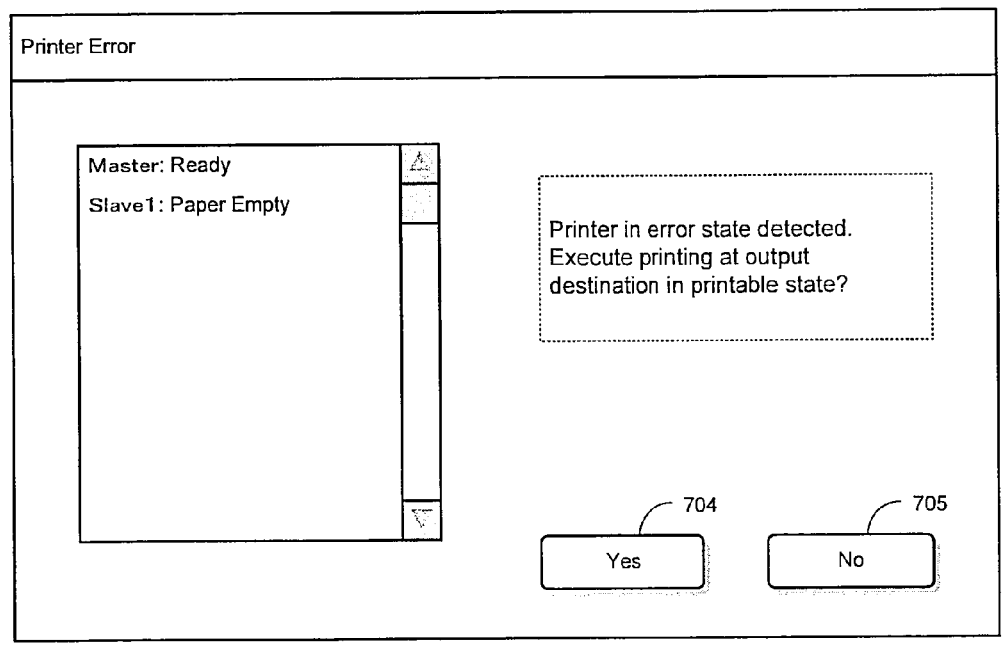

FIGS. 7A and 7B are explanatory drawings that show one example of an error warning screen to be displayed by the print continuation/cancellation operating section 206 of FIG. 2A. Of these, the screen shown in FIG. 7A is one example of the screen to be displayed at step S910. Upon selection of the cancellation ("NO" button 705) in the displayed screen, the PCL printer driver 12 terminates the job without transferring PJL to the communication driver, thereby cancelling the print job. In contrast, upon selection of the printing continuation ("YES" button 704), the routine proceeds to step S912 at which it is determined whether or not the destination of the slave printer command has been changed from that of the execution request of the previous print job (step S912). In the present embodiment, the respective printers are supposed to be connected to one another through a network using TCP/IP connections, with the destination being set to the IP address of each of the printers. In the case when any change has been made on the destination, a screen used for informing the user of any change on the slave printer is displayed by an informing section, not shown (step S913).

Figure 8:
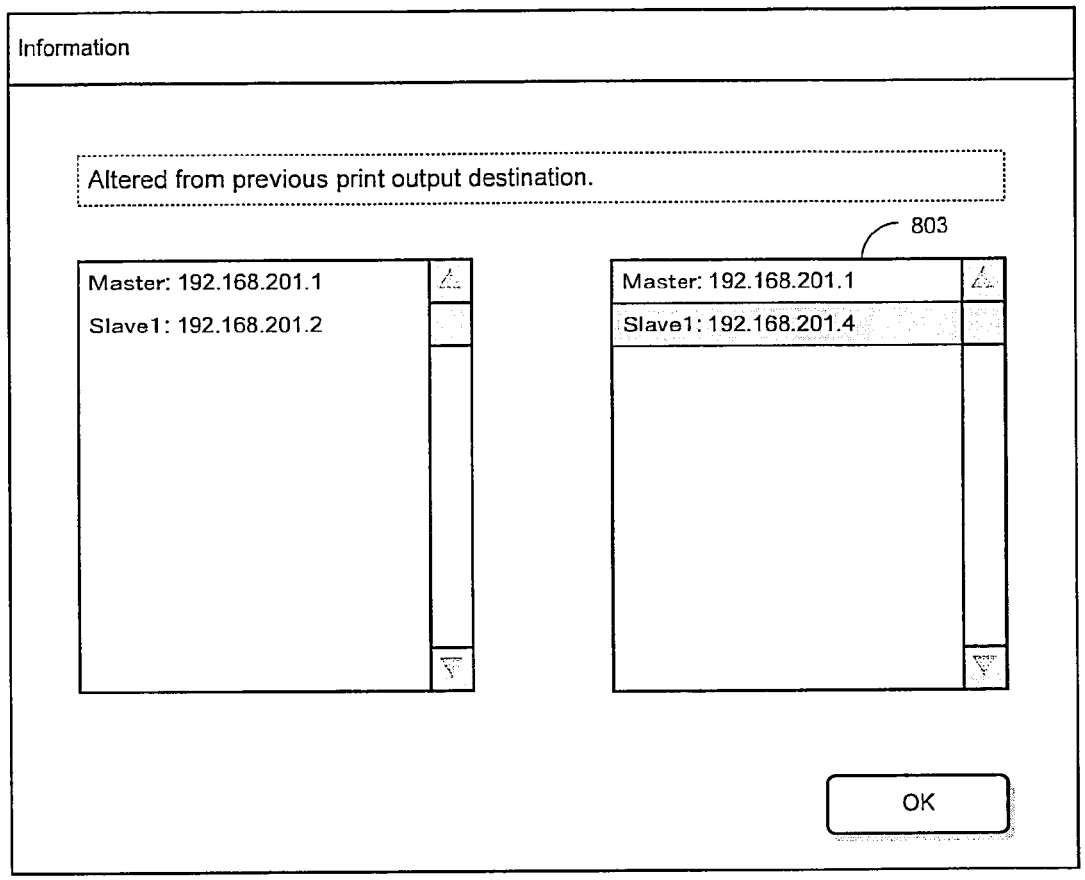
FIG. 8 is an explanatory drawing that shows one example of a warning screen that is given by an informing section when an acquired command destination to a sub-printing apparatus is different from the previous print job request in a printing control program relating to the present invention.

FIG. 8 is an explanatory drawing that shows one example of a warning screen that is given when the acquired destination of a printer command to a slave printer is different from that of the previous print job request.

Alternatively, the print job to be given to the printer that has been determined as having any error or inconsistency may be altered to be processed by using another printer having no error or inconsistency depending on the determination at step S909. In this case, since the common PJL system is used in the respective apparatuses, the altering process is carried by only altering the information inherent to the corresponding apparatus so that it is easily achieved.

FIG. 7B is an explanatory drawing that shows an example of a screen that is used upon detection of any printer with an error so as to inform the user of the fact and allow the user to make a selection as to whether or not another printer without any error should be used to conduct the print job. As shown in FIG. 7B, in the case when no paper is present in the printer of slave 1, the user is informed of the fact that no print job is available, and allowed to make a selection as to whether or not the corresponding output is alternatively given to the master printer capable of executing the print job based upon the screen. When the user selects "YES" button 704, the print job to be originally processed by the printer of slave 1 is generated so as to be processed by the master printer, and the master printer executes the print job. In contrast, when the user selects "NO" button 705, the print job is not altered and PJL for the printer of slave 1 is generated. The printer command transmitting section 214 to the slave 1 printer suspends a transmission of PJL until sheets of paper have been supplied to slave 1 so as to return to its printable state. During this period of time, the status acquiring section 205 of FIG. 1 monitors the status of the printer of slave 1, and the printer command transmitting section 214 transmits the PJL when sheets of paper have been supplied so that the printable state is restored.

Here, some of printing apparatuses are provided with a large capacity memory capable of holding PJL transmitted from the PCL printer driver 12 therein, for example, a hard disk. In the case of printing apparatuses of this type, the PCL printer driver 12 may transmit the PJL without suspending the transmission thereof, even when the printing apparatus is not in a printable state. The printing apparatus holds the received PJL in the memory, and after the printable state has been restored, the job the PJL of which has been held in the memory may be executed.

Successively, the PCL printer driver 12 generates PJL with tandem printing setups (step S914).

Next, the PCL printer driver 12 determines whether or not a function for displaying a user authentication setting screen has been set prior to the execution of printing (step S915). This function is set by the user through a "Auto Job Control Review" check box 505 on the screen shown in FIG. 5. When this function has been set, a user authentication screen of FIG. 5 is displayed, and the user needs to input a login name in a "Login Name" input section 503 and a password in a "Password" input section 504 that are required for the user authentication (step S916). This step provides a function for the authentication data inputting section. When this function has not been set, the routine proceeds to step S917 without calling for the inputs of the login name and password. At step S917, the PCL printer driver 12 generates PJL of the user authentication with respect to all the master and slave printers. In the case when the login name and password required for user authentication have been inputted at step S916, the inputted login name and password are added to the PJL of the user authentication. The process of step S917 is a process required for allowing the printer command transmitting section 214 of the printer driver 13 to achieve the function of the authentication data adding section.

Next, the PCL printer driver 12 generates PJL commands in PDL language (step S918). Then, it transfers PJL commands that have been generated to the communication driver, and requests the communication driver to transmit them to each of the printers (step S919). The following description will discuss the Windows that is one example of the operating system supplied by the print control unit 1. The PCL printer driver 12 transfers a print job containing generated PJL commands and print data to a spooler provided by the Windows. The spooler transfers the print job thus transferred to the communication driver on a block basis, and the communication driver transmits the print job to each of the printers.

Figure 13:
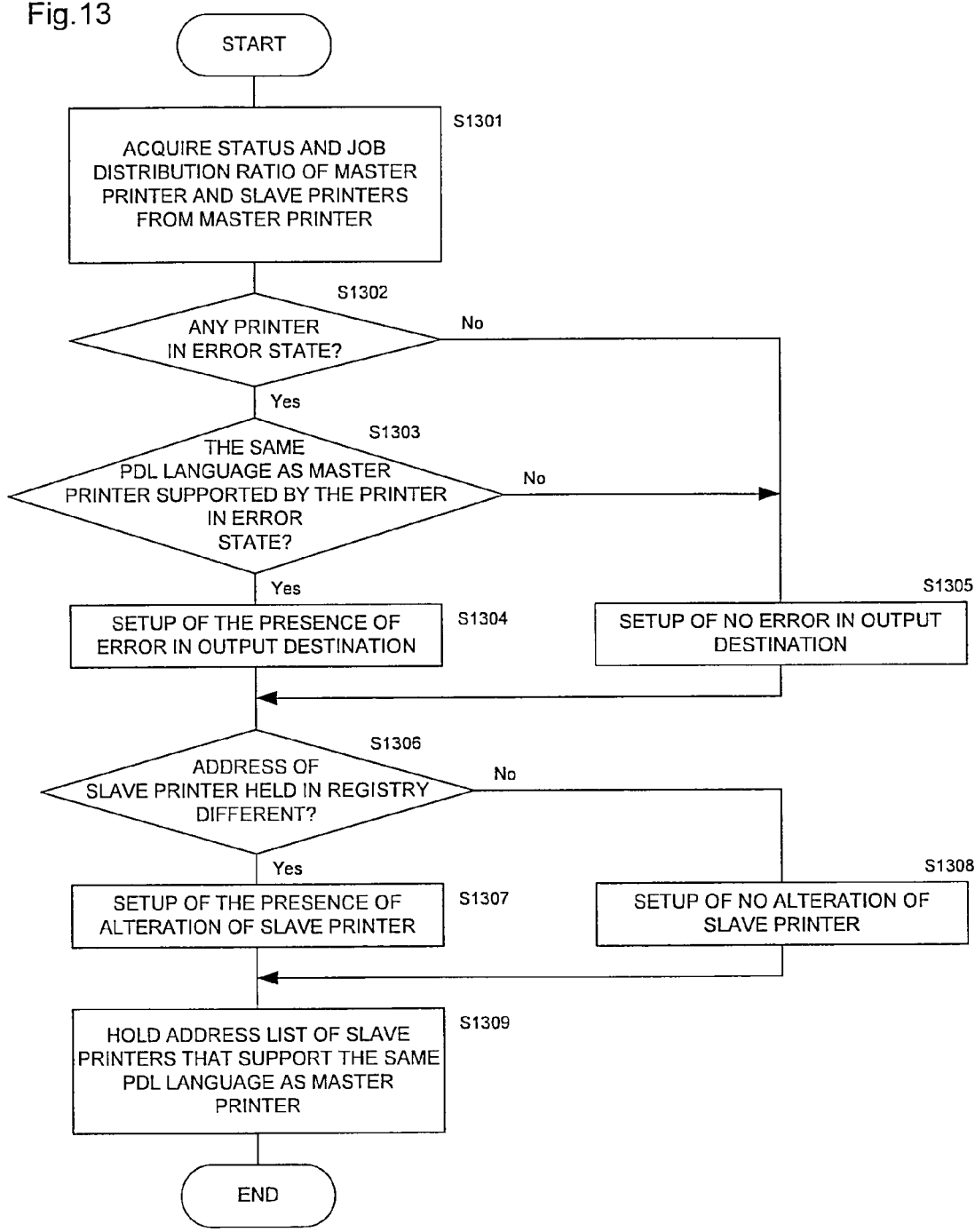
FIG. 13 is a flowchart that shows a "acquire tandem print setting information" process (step S908) of FIG. 9 in detail.

The following description will discuss a "tandem print setting information acquiring" process (step S908) of FIG. 9 in detail. FIG. 13 is a flowchart that indicates this process in detail. As shown in FIG. 13, the PCL printer driver 12 acquires the apparatus information and status of the printer 2 itself and the slave printer 3 from the master printer 2. The apparatus information acquired here relates to the printer command destination of the slave printer 3 and information used for calculating the distribution ratio of the print job between the master and slave printer (step S1301). Based upon the acquired status, it is determined whether or not there is any error-state printer based upon the acquired status (step S1302). If there is no error-state printer, a flag indicating that no error-state printer exists is set so as to be used in succeeding determinations (step S1305), and the routine proceeds to S1306. In contrast, if there is any error-state printer present, it is determined whether or not the error-state printer is a printer that supports the same PDL language as the master printer 2 (step S1303). As the result of the determination, when the error-state printer does not support the same PDL language as the master, the routine proceeds to S1305. Here, a flag indicating that no error-state printer exists is set (step S1305), and the sequence proceeds to S1306. This is because, even in the case when the corresponding printer is in an error state, if it does not support the PDL language of the print job to be executed, the print job does not form a subject to be executed. In contrast, when the error-state printer supports the same PDL language as the master, a flag indicating that any error-state printer exists is set so as to allow succeeding determinations (step S1304), and the routine proceeds to S1306.

At step S1306, the PCL printer driver 12 determines whether or not the slave printer command destination acquired at step S1301 has been changed from the destination used upon request of the execution of the previous print job. If no change exists, a flag indicating that no change exists in the slave printer command destination is set so as to allow succeeding determinations (step S1308), and the routine proceeds to step S1309. In contrast, if any change exists, a flag indicating that any change exists in the slave printer command destination is set so as to allow succeeding determinations (step S1307), and the routine proceeds to step S1309. Moreover, the address list of the slave printer that supports the same PDL language as the master printer 2 and the distribution ratio of the job acquired in the step S1301 are held in a registry.

The above-mentioned is an example of the sequence of processes for starting a print job to be executed by the PCL printer driver 12.

Figure 10:
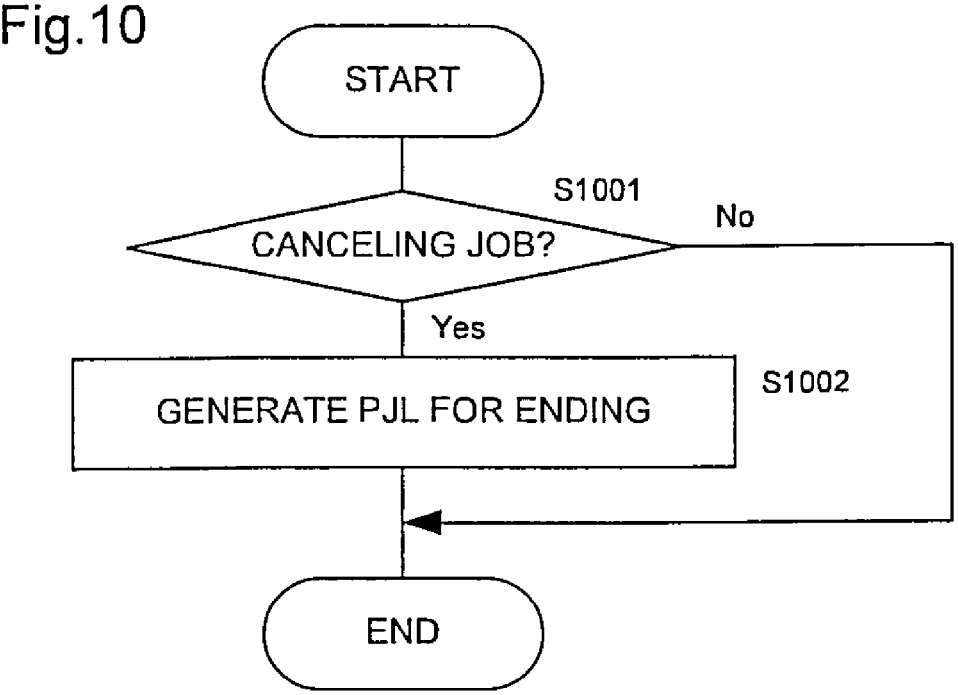
FIG. 10 is a flowchart that shows one example of a sequence of processes for finishing a print job that has been executed by the PCL printer driver 12 or the PS printer driver 16 in FIG. 1.

The following description will discuss an example of a sequence of processes for completing the print job. FIG. 10 is a flowchart that shows one example of the sequence of processes for completing the print job that the PCL printer driver 12 executes. After having generated all the PJL commands, the PCL printer driver 12 generates a PJL command used for completing the print job. As shown in FIG. 10, the PCL printer driver 12 determines whether or not the print job that has been started is cancelled in the middle (step S1001). If the print job has not been cancelled, a PJL command for completing the print job is generated (step S1002). When the print job has been cancelled, the sequence is terminated without generating the PJL command for completion. By generating the PJL command for completion of the print job, a sequence of PJL command generating processes relating to the print job is completed.

The following description will discuss a sequence of processes in the communication driver 13 in which printer commands, generated by the PCL printer driver 12, are transmitted to each of the printers.

Figure 11:
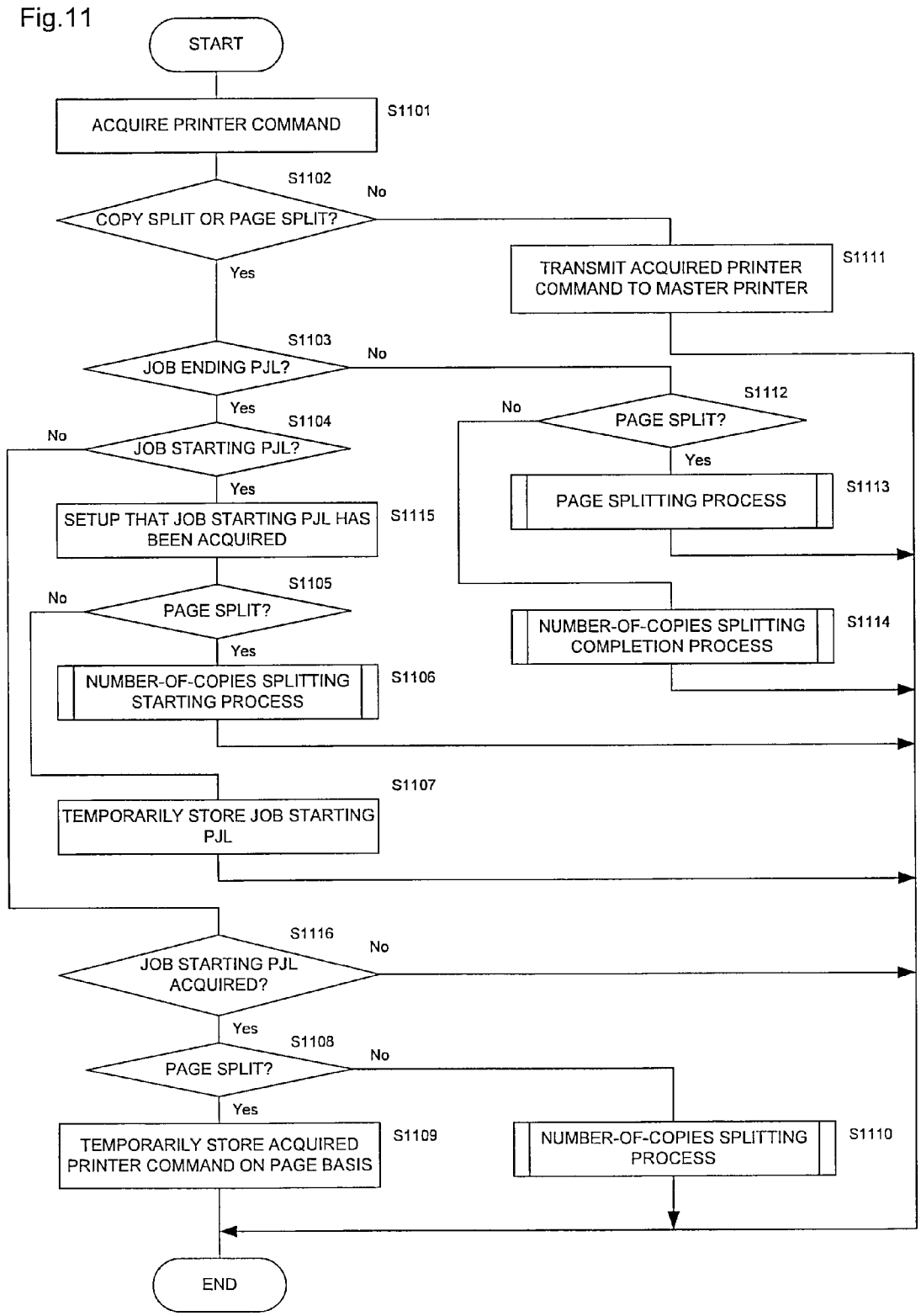
FIG. 11 is a flowchart that shows one example of a sequence of communication processes that are executed by the communication driver 13.

FIG. 11 is a flowchart that shows one example of a sequence of communication processes executed by the communication driver 13 of FIG. 1. As shown in FIG. 11, the printer command acquiring section 211 of the communication driver 13 acquires printer commands generated by the PCL printer driver 12 (step S1101). Here, it is determined whether or not the number-of-copies splitting process or the page-splitting process has been set (step S1102). These setups are carried out by the user on the screen of FIG. 3. In the case when neither the number-of-copies splitting process nor the page-splitting process has been set, since no tandem printing process is executed, the acquired printer commands are transmitted to only the master printer 2 (step S1111), thereby completing the processes.

In contrast, when either the number-of-copies splitting process or the page-splitting process has been set, it is determined whether or not the acquired printer command is the PJL command for completing the job (step S103). In the case of the PJL command for job ending, it is determined whether or not the page-splitting process has been set (step S1112). In the case when the page-splitting process has been set, the page-splitting process is executed (step S1113), thereby completing the sequence of processes. The page-splitting process will be described later in detail. In contrast, in the case when, upon determination at step S1112, no page-splitting process is set, the number-of-copies splitting completion process (step S1114) is carried out, thereby completing the sequence of processes. The number-of-copies splitting completion process will be described later in detail.

Upon determination at the above-mentioned step S1103, if the job ending PJL is not given, the communication driver 13 determines whether or not the acquired printer command corresponds to the PJL command for starting a job (step S1104). In the case of the PJL command for starting a job, a flag indicating that the job starting PJL has been acquired is set (step S1115). Then, it is determined whether or not the page-splitting process has been set (step S1105). In the case when the page-splitting process has been set, the job starting PJL is temporarily stored (step S1107), thereby completing the processes. In contrast, in the case when the page-splitting process is not set, that is, in the case when the number-of-copies splitting process has been set, the number-of-copies splitting starting process is executed (step S1106), thereby completing the processes. The number-of-copies splitting process will be described later in detail.

In the case when upon determination at step S1104, the acquired PJL is not a job starting PJL, it is determined whether or not a job starting PJL has been acquired (step S1116), and if it has not been acquired, the processes are completed. If the job starting PJL has been acquired, it is determined whether or not a page-splitting process has been set (step S1108). In the case when the page-splitting process has been set, the acquired printer commands are temporarily stored on a page basis (step S1109). In contrast, when the page splitting process is not set, the number-of-copies splitting process (step S1110) is executed, thereby completing the sequence of processes. The number-of-copies splitting process will be described later in detail.

Figure 14:
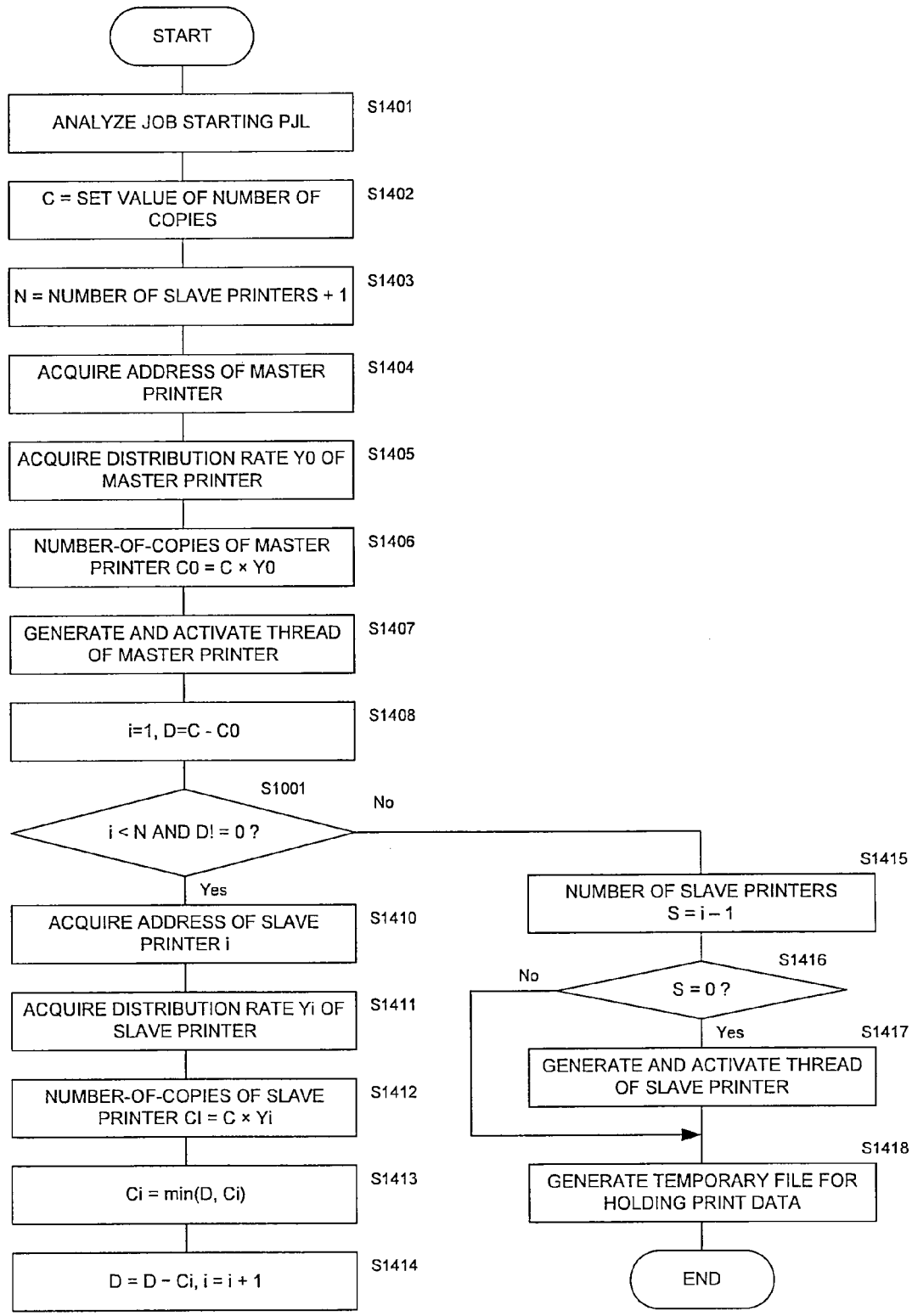
FIG. 14 is a flowchart that shows a "number-of-copies splitting start process" (step S1106) of FIG. 11 in detail.

The following description will discuss the number-of-copies splitting starting process at step S1106 in detail. FIG. 14 is a flowchart that shows the number-of-copies splitting starting process at step S1106 of FIG. 11. In this process, the communication driver 13 determines the distribution of sets-of-copies to the respective printers of the master and slaves, and activates and generates threads for the respective printing apparatuses. As shown in FIG. 14, the communication driver 13 first analyzes the job starting PJL (step S1401). Next, the sets-of-copies, set in the sets-of-copies setup 302 on the screen of FIG. 3, is stored in a variable C so as to be used in calculations of the distribution of sets-of-copies (step S1402). Then, the number of slave printers+1 is stored in a variable N (step S1403). In this embodiment, N is 2.

Successively, the IP address of the master printer 2 and the distribution ratio (Y0) of the print job to the master are acquired from the output destination information holding section 207 (steps S1404, S1405). Moreover, the product between the number-of-copies stored in the variable C and the distribution ratio Y0 to the master is calculated so that the number-of-copies (C0) to be shared to the master printer 2 is found (step S1406).

Next, the communication driver 13 activates and generates threads used for controlling communications with the master printer 2 (step S1407). Here, with respect to the threads activated in this case, the specific contents of the process are shown in a flowchart of FIG. 18. The communication driver 13 transmits a job starting PJL to the master printer 2. Thereafter, it successively transmits the print data generated by the PCL printer driver so as to be stored in temporary files, to the printer 2. Lastly, it transmits the job ending PJL. In most cases, the print data is generated in a cooperative manner into a plurality of blocks. In this case, the transmitting process of the print data is carried out intermittently on a block basis.

Successively, the communication driver 13 determines the rate of distribution to the slave printer 3, and activates and generates threads used for controlling the communication. In the present embodiment, only one slave printer has been exemplified; however, the flowchart indicates a structure that can use a plurality of slave printers. First, 1 is stored in the temporary variable i for use in processing, and a difference between C and C0, that is, a total number of copies to be printed by the slave printers is stored in D (step S1408). Moreover, in order to repeat the loop process as many times as the number of the slave printers, it is determined whether or not the variable i is smaller than N (step S1409). In this embodiment, since N=2 holds, the result of determination becomes true (Yes) only once. In the case of two or more slave printers, the following processes are repeated as many times as the number of the slave printers.

First, the communication driver 13 acquires the IP address of the slave printer i and the rate of distribution Yi from the output destination information holding section 207 as apparatus information (steps S1410, S1411). Here, i=1 holds. Next, the product between the number of copies stored in the variable C and the ratio of distribution Yi to the slave printer i is calculated so that the number of copies (Ci) to be shared to the slave printer i is found (step S1412). Moreover, the minimum value between Ci thus found and D is found, and newly set as Ci (step S1413). This process is carried out so as to round down errors derived from the calculations of the product to make the total number of copies of the respective printers equal to the set number of copies. Moreover, the communication driver 13 stores D−Ci in variable D, and after adding 1 to i (step S1414), the sequence proceeds to the determining process at step S1409.

After the processes have been carried out on all the slave printers in this manner, the determination of step S1409 becomes "NO", and the sequence proceeds to S1415. Here, the communication driver 13 finds the number of the slave printers S, and if the value of S is not 0 (step S1416), then it activates and generates threads corresponding to the respective slave printers (step S1417). Moreover, it generates a temporary file used for temporarily storing print data to be generated (step S1418), thereby completing the sequence of processes.

The above-mentioned is the detailed explanation of the number-of-copies splitting starting process at step S1106 in FIG. 11.

Figure 15:
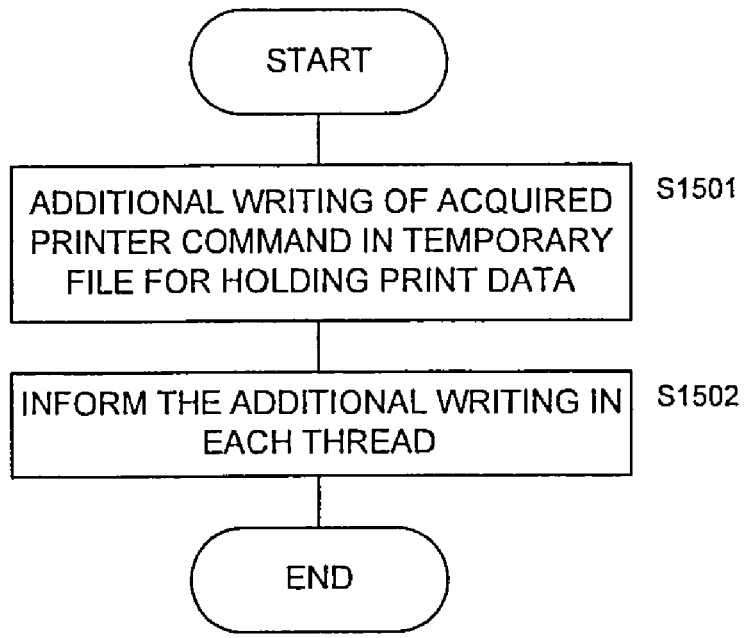
FIG. 15 is a flowchart that shows a "number-of-copies splitting" process (step S1110) of FIG. 11 in detail.

The following description will discuss the number-of-copies splitting process at step S1110 of FIG. 11 in detail. FIG. 15 is a flowchart that shows the "number-of-copies splitting process"(step S1110) of FIG. 11, in detail. As shown in FIG. 15, the communication driver 13 additionally writes the acquired printer commands in the temporary file used for holding print data generated at step S1418 of FIG. 14 (step S1501). Moreover, it notifies the respective threads activated and generated for communication controls with the respective printers of the fact that the additional writing has been carried out on the temporary file (step S1502), thereby completing the sequence of processes. In response to the notification, the respective threads transmit the generated print data to the printers. The above-mentioned is the detailed explanation of the number-of-copies splitting process.

Figure 16:
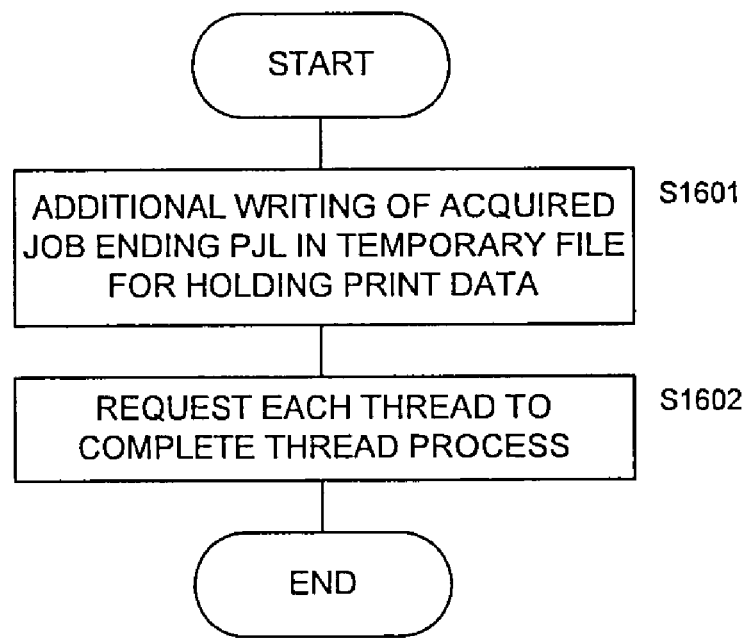
FIG. 16 is a flowchart that shows a "number-of-copies splitting completion process" (step S1114) of FIG. 11 in detail.

The following description will discuss the number-of-copies splitting completion process at step S1114 of FIG. 11 in detail. FIG. 16 is a flowchart that shows the "number-of-copies splitting completion process" (step S1114) of FIG. 11. As shown in FIG. 16, the communication driver 13 additionally writes a PJL command for job ending in the temporary file used for holding print data generated (step S1601). Moreover, it requests the respective threads that carry out communication controls with the respective printers to complete the sequence of processes (step S1602). In other words, it issues events for completing the sequence of processes so as to confirm the completion of all the threads. In response to the request for completion, the respective threads transmit the contents remaining in the temporary files to the respective printers. If there is any print data remaining, the data is transmitted, and lastly, the PJL command for job ending, written in the temporary file, is transmitted. After having confirmed that all the threads were completed, the communication driver 13 deletes the temporary file generated to temporarily store the print data. After having finished the processes, the respective threads are eliminated. The above-mentioned is the detailed explanation of the number-of-copies splitting process.

Figure 17:
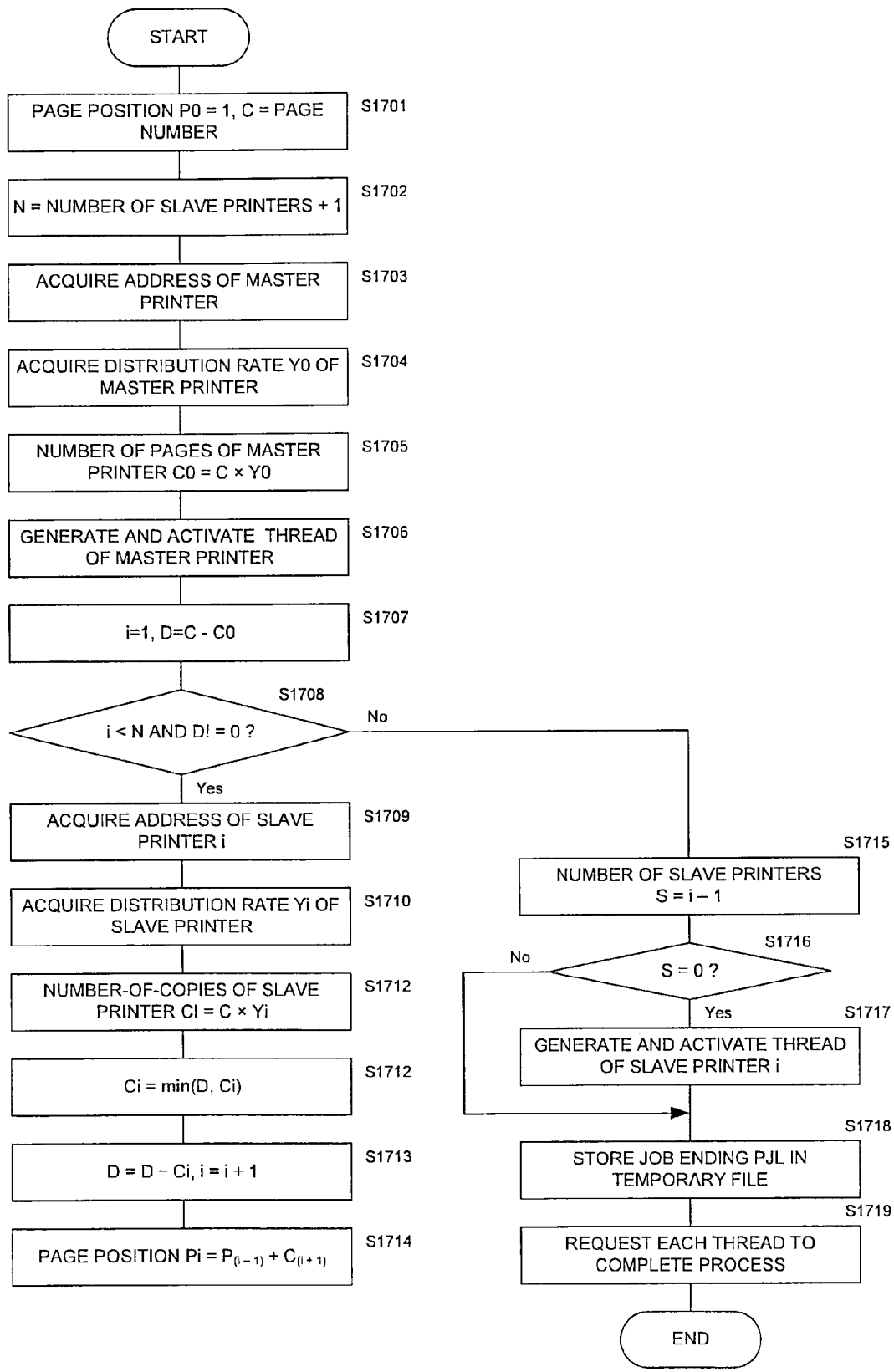
FIG. 17 is a flowchart that shows a "page splitting process" (step S1113) of FIG. 11 in detail.

Next, the following description will discuss the page-splitting process at step S1113 of FIG. 11 in detail. In this process, the communication driver 13 determines the distribution of the numbers of pages to the respective printers of the master and slaves and the leading position of the pages to be printed, and activates and generates threads of the respective printing apparatuses. FIG. 17 is a flowchart that shows the "page-splitting process" (step S1113) of FIG. 11 in detail. As shown in FIG. 17, the communication driver 13 first stores 1 in the variable P0 so as to specify the leading position of pages to be printed, and stores the total number of pages of the requested print job in the variable C used for specifying the number of pages to be printed (step S1701).

Next, it stores the number of slave printers+1 in the variable N (step S1702). In this embodiment, N is 2.

Successively, it acquires the IP address of the master printer 2 and the ratio of distribution (Y0) of the print job to the master from the output destination information holding section 207 (steps S1703, S1704). Moreover, by calculating the product between the total number of pages stored in the variable C and the ratio of distribution Y0 to the master, it finds the number of copies (C0) to be shared to the master printer 2 (step S1705).

Figure 19:
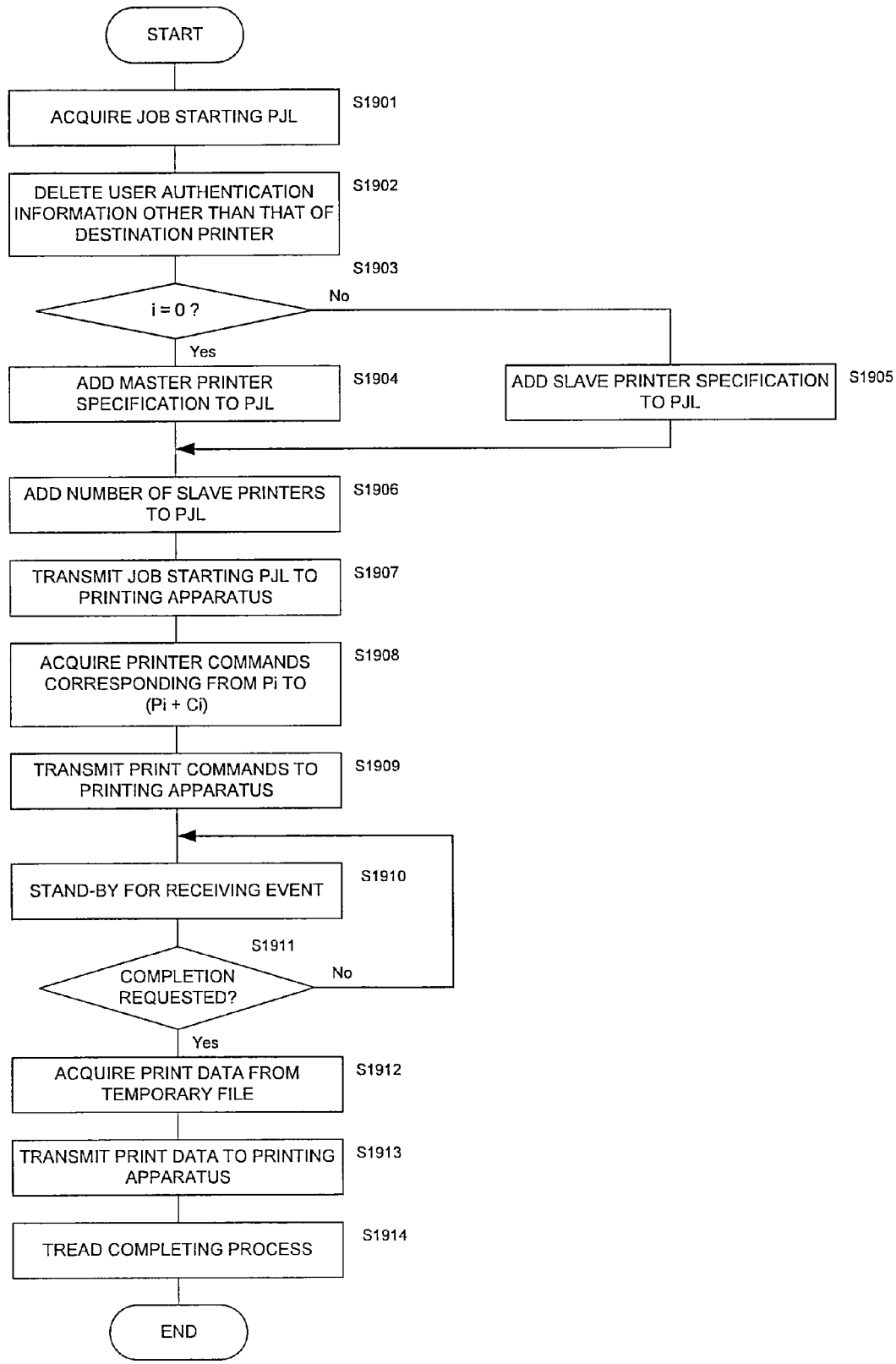
FIG. 19 is a flowchart that shows a sequence of data transmission processes upon splitting pages within the thread activated by the process of FIG. 17.

Next, the communication driver 13 activates and generates threads that control communications with the master printer 2 (step S1706). With respect to the threads activated here, the flowchart of FIG. 19 shows the contents of processes thereof in detail. The communication driver 13 transmits the job starting PJL to the master printer 2. Thereafter, the print data generated by the PCL printer driver so as to be stored in the temporary file are successively transmitted to the printer 2. Lastly, the job ending PJL is transmitted. In most cases, the print data is generated in a cooperative manner into a plurality of blocks. In this case, the transmitting process of the print data is carried out intermittently on a block basis.

Successively, the communication driver 13 determines the rate of distribution to the slave printer 3, and activates and generates threads used for controlling the communication. In the present embodiment, only one slave printer has been exemplified; however, the flowchart indicates a structure that can use a plurality of slave printers. First, 1 is stored in the temporary variable i for use in processing, and a difference between C and C0, that is, a total number of copies to be printed by the slave printers is stored in D (step S1707). Moreover, in order to repeat the loop process as many times as the number of the slave printers, it is determined whether or not the variable i is smaller than N (step S1708). In this embodiment, since N=2 holds, the result of determination becomes true (Yes) only once. In the case of two or more slave printers, the following processes are repeated as many times as the number of the slave printers.

First, the communication driver 13 acquires the IP address of the slave printer i and the rate of distribution Yi as apparatus information (steps S1709, S1710). Here, i=1 holds. Next, the product between the number of copies stored in the variable C and the rate of distribution Yi to the slave printer i is calculated so that the number of print pages (Ci) to be shared to the slave printer i is found (step S1711). Moreover, the minimum value between Ci thus found and D is found, and newly set as Ci (step S1712). This process is carried out so as to round down errors derived from the calculation of the product to make the total number of print pages of the respective printers equal to the set total number of pages. Moreover, the communication driver 13 stores D-Ci in variable D, and adds 1 to i (step S1713). Then, a value, P(i−1)+C(i−1), is stored in variable Pi used for storing the print leading page of each of the printers (step S1714), and the sequence proceeds to a determining process at step S1708. In this embodiment, a value, P0+C0=1+C0 (C0 corresponds to the number of print pages of the master printer 3), is stored in Pi.

After the processes have been carried out on all the slave printers in this manner, the determination of step S1708 becomes "NO", and the sequence proceeds to S1715. Here, the communication driver 13 finds the number of the slave printers S, and if the value of S is not 0 (step S1716), then it activates and generates threads corresponding to the respective slave printers (step S1717). Then, it stores a PJL command for completing the job in a temporary file used for temporarily storing print data to be generated (step S1718). Thus, after having requested the respective threads to complete the processes, it completes the sequence of processes (step S1719).

The above-mentioned is the detailed explanation of the page splitting process at step S1113 in FIG. 11.

Figure 18:
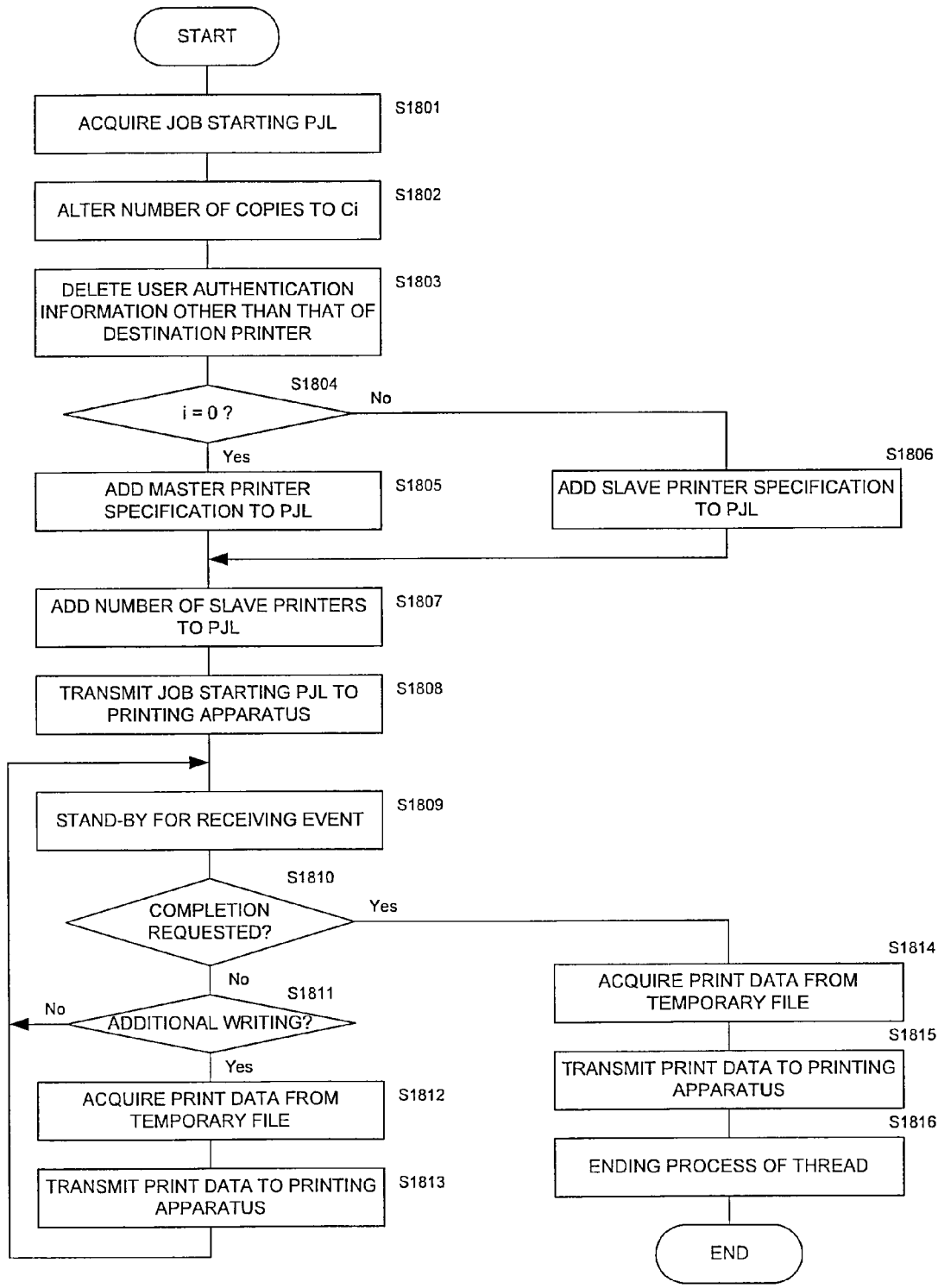
FIG. 18 is a flowchart that shows a sequence of data transmission processes upon splitting the number of copies within a thread activated by the process of FIG. 14.

FIG. 18 is a flowchart that shows a sequence of data transmission processes upon splitting the number of copies within a thread activated by the process of FIG. 14. As shown in FIG. 18, the thread acquires job starting PJL commands (step S1801). In this embodiment, the master printer and the slave printer commonly use the same PJL system. Therefore, among the acquired job starting PJL commands, those having different parameter values are substituted. First, the thread alters the sets of copies to those sets of copies Ci shared to the corresponding printers (step S1802). Moreover, it deletes the user authentication information other than that of the corresponding printers (step S1803).

Next, the above-mentioned thread determines whether or not the printer corresponds to the master printer (step S1804). When it corresponds to the master printer, an identification instruction for identification as being the master printer is added to the job starting PJL (step S1805). When it corresponds to a slave printer, an identification instruction for identification as being a slave printer is added to the job starting PJL (step S1806). This identification command may contain a unique identifier for each of the printers, and each printer may be allowed to add this identifier contained in the identification command to a response command.

Moreover, the above-mentioned thread adds the identification number of the slave printer to the job starting PJL (step S1807). Then, it transmits the job starting PJL to the corresponding printer (step 51808).

Thereafter, the above-mentioned thread enters a standby mode waiting for a receiving event (step S1809). Upon occurrence of a receiving event in the standby mode, it first determines whether or not the received command is a completion request (step S1810). Upon receipt of the completion request, it acquires print data contained in the temporary file (step S1814), and transmits all the acquired print data to the printer (step S1815). After a job ending PJL has been transmitted, a thread completion process is carried out (step S1816). Consequently, the thread is eliminated. The communication driver 13, which has transmitted the completion request, waits for the completion of all the threads, and after having confirmed that all the threads have finished the completion process, it deletes the generated temporary file.

In contrast, upon receipt of a command other than the completion request at the above-mentioned step S1810, it determines whether or not there is any additionally written print data (step S1811). When there is any additionally written print data, it acquires the print data that has been additionally written from the temporary file (step S1812) so that the acquired print data is transmitted to the printing apparatus (step S1813). Thus, the routine proceeds to step S1809, and enters a standby mode waiting for the next event. In the case of no additionally written data, the routine proceeds step S1809 without carrying out any processes, and enters a standby mode waiting for the next event.

The above-mentioned is a detailed explanation of the data transmitting process of the thread activated by the process of FIG. 14.

The following description will explain FIG. 19. FIG. 19 is a flowchart that shows a sequence of data transmitting processes that are carried out upon number-of-copies splitting within the thread activated by the process of FIG. 17. As shown in FIG. 19, the thread acquires the job starting PJL (step S1901). In this embodiment, the master printer and the slave printer commonly use the same PJL system. Therefore, among the acquired job starting PJL commands, those having different parameter values are substituted. First, the user authentication information other than that of the corresponding printer is deleted (step S1902). Consequently, the remaining user authentication information is added to the job starting PJL, and transmitted to the corresponding apparatus. The process at step S1902 achieves a function for the aforementioned authentication data adding section.

Next, the above-mentioned thread determines whether or not the related printer corresponds to the master printer (step S1903). When it corresponds to the master printer, an identification instruction for identification as being the master printer is added to the job starting PJL (step S1904). When it corresponds to a slave printer, an identification instruction for identification as being a slave printer is added to the job starting PJL (step S1905). This identification command may contain a unique identifier for each of the printers, and each printer may be allowed to add this identifier contained in the identification command to a response command.

Moreover, the job starting PJL is transmitted to the corresponding printer (step S1906). The corresponding printer acquires a printer command with respect to Pi+Ci based upon the page position Pi (step S1907), and the acquired printer command is transmitted to the corresponding printer (step S1908).

Thereafter, the above-mentioned thread enters a standby mode waiting for a receiving event (step S1909). Upon occurrence of a receiving event in the standby mode, it first determines whether or not the received command is a completion request (step S1910). Upon receipt of the completion request, it acquires print data contained in the temporary file (step S1911), and after having transmitted all the acquired print data to the printer (step S1912), a thread completion process is carried out (step S1913). Consequently, the thread is eliminated.

In contrast, upon receipt of a command other than the completion request at the above-mentioned step S1910, the routine proceeds to step S1909 without carrying out any processes, and enters a standby mode waiting for the next event.

The above-mentioned is a detailed explanation of the data transmitting process of the thread activated by the process of FIG. 17.

Figure 4:
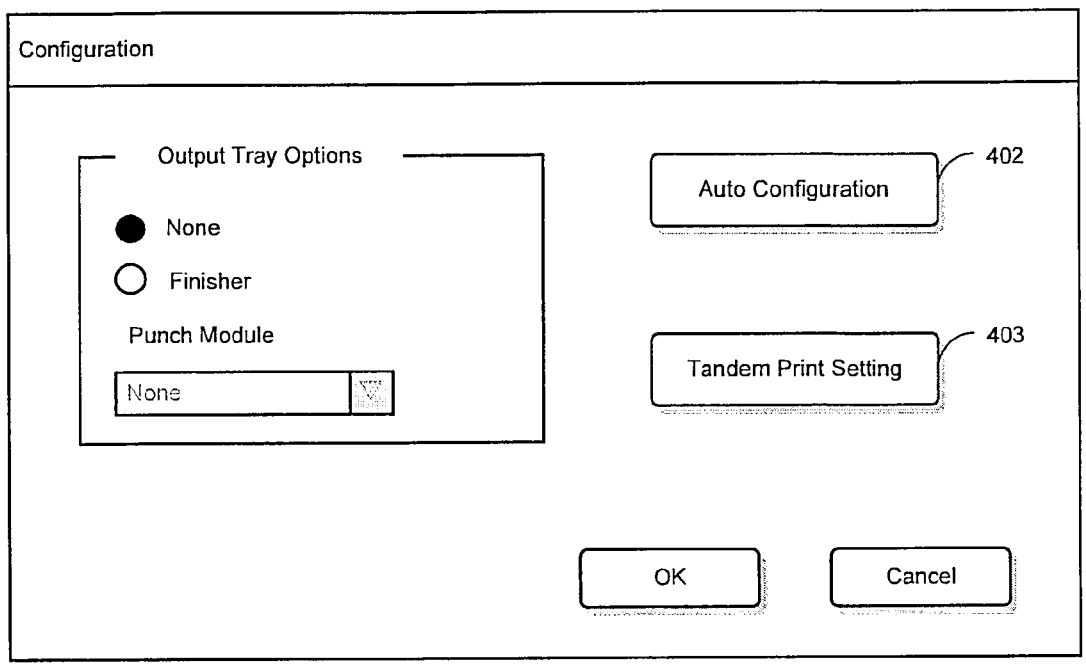
FIG. 4 is an explanatory drawing that shows one example of an optional device setting screen supplied to the user by the PCL printer driver 12 or PS printer driver 16 shown in FIG. 1.

FIG. 4 is an explanatory drawing that shows one example of an optional device setting screen supplied to the user by the PCL printer driver 12 or PS printer driver 16 shown in FIG. 1.

Figure 12:
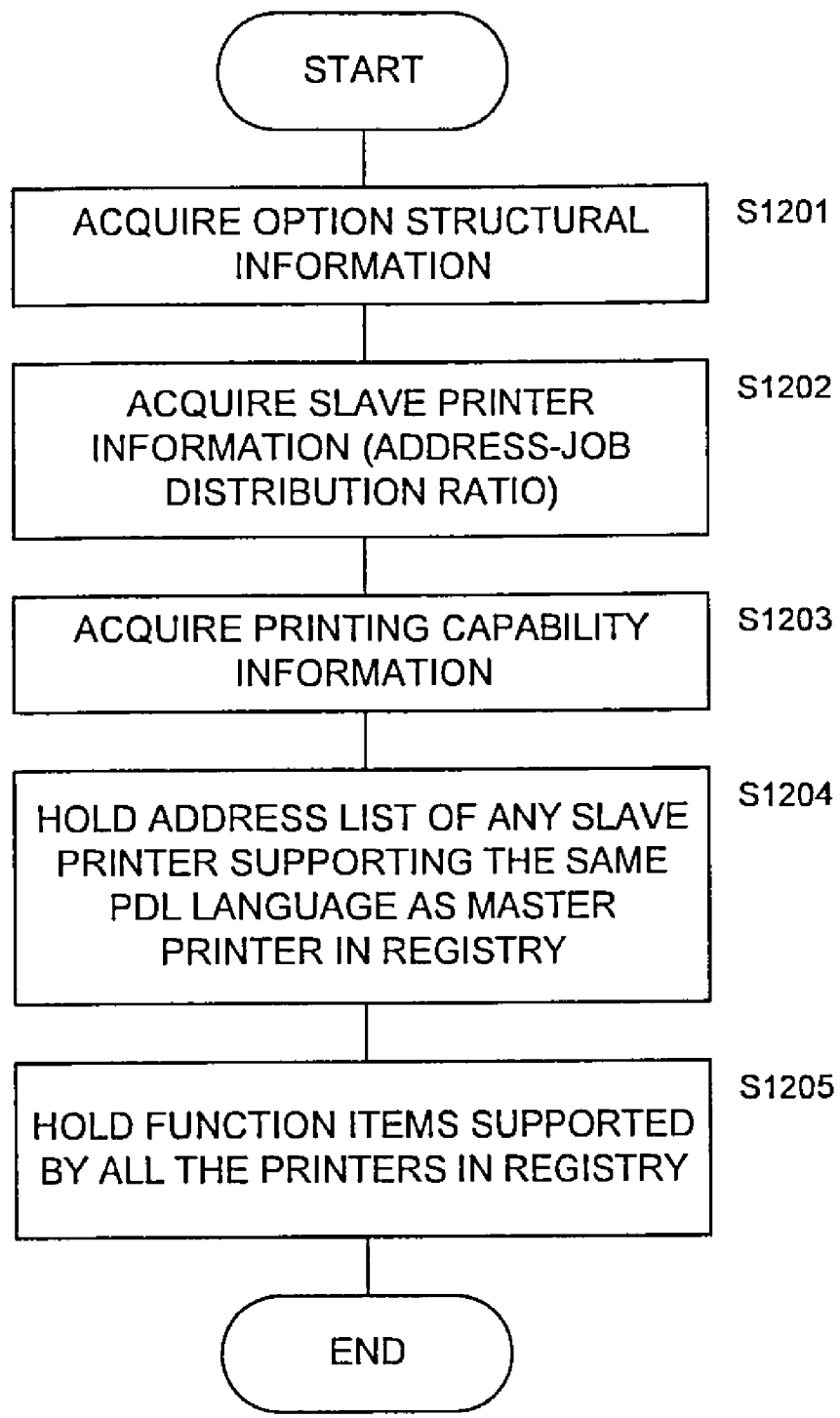
FIG. 12 is a flowchart that shows one example of a sequence of processes to be executed by the PCL printer driver 12 or PS printer driver 16 when an "Auto Configuration" button 402 is clicked on the function setting screen shown in FIG. 4.

FIG. 12 is a flowchart that shows one example of a sequence of processes to be executed by the PCL printer driver 12 when an "Auto Configuration" button 402 is clicked on the function setting screen shown in FIG. 4. The "Auto Configuration" button 402 refers to a button that is operated by the user after a print control program has been installed in a print control unit or when a print control unit is placed. Alternatively, this is operated by the user when the print control program, the printing apparatus or the connection setting of the network is altered.

As shown in FIG. 12, the PCL printer driver 12 first acquires the structure information of the option as apparatus information (step S1201). Moreover, it acquires the IP address and the distribution ratio of the job from the master printer 2 as apparatus information of the slave printer 3 (step S1202). Furthermore, it also acquires information relating to a printing capability of each of the apparatuses as apparatus information (step S1203). Then, it stores the IP address and the distribution ratio of the job of the slave printer that supports the same PDL language as the master printer 2 in a registry (step S1204). Moreover, it stores functions supported by all the printers in the registry in a separate manner depending on their items (step S1205). The registry corresponds to the output destination information holding section 207.

The above-mentioned corresponds to processes of the PCL printer driver 12 that are carried out when an "Auto Configuration" button 402 is clicked on the function setting screen shown in FIG. 4, and the functions of steps S1201 to S1205 correspond to those of the apparatus information acquiring section 204 of FIG. 2A.

Figure 6:
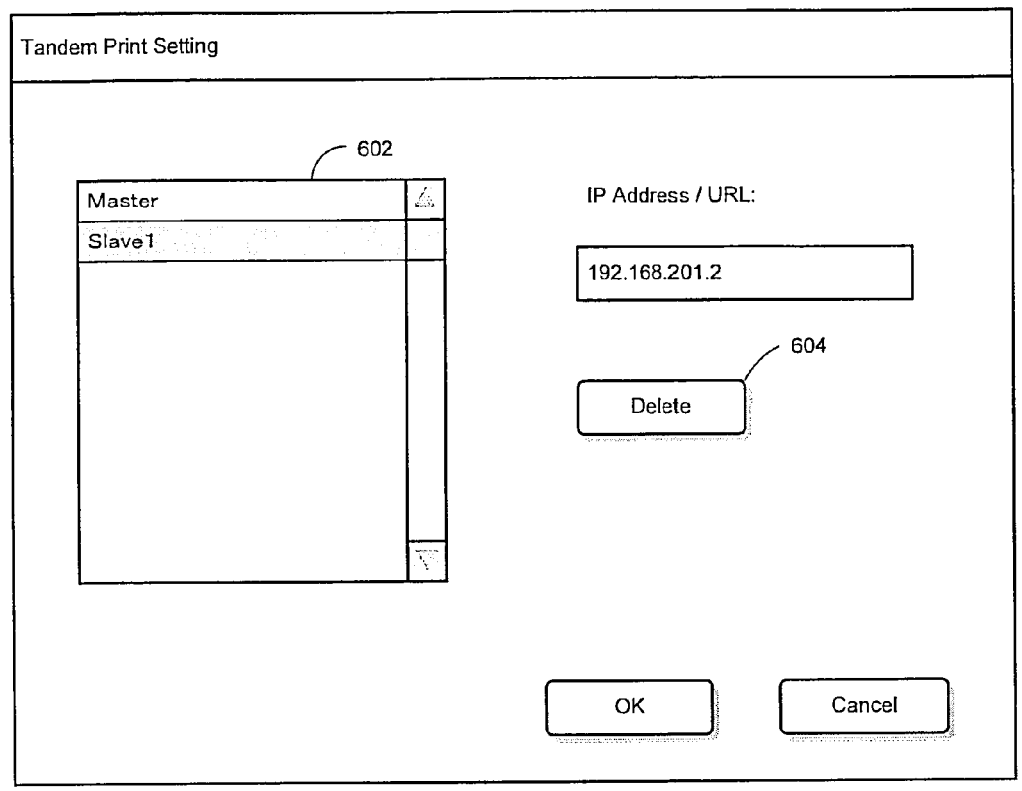
FIG. 6 is an explanatory drawing that shows one example of a setting screen that is displayed when a "Tandem Print Setting" button 403 shown in FIG. 4 is clicked.

Moreover, FIG. 6 is an explanatory drawing that shows one example of a setting screen that is displayed when a "Tandem Print Setting" button 403 shown in FIG. 4 is clicked. In FIG. 6, a "Delete" button 604 is a button used for excluding a selected printing apparatus among the printing apparatuses that are listed in the display section 602 from objects to be subjected to a print job. By pressing this button, the PCL printer driver 12 executes functions as the aforementioned non-selection apparatus specifying section. In other words, it generates no PJL commands for a print job for the apparatus excluded from the execution objects, and consequently transmits no control instruction relating to a print job thereto.

The invention being thus described, it will be obvious that the same may be varied in many ways. Such variations are not to be regarded as a departure from the spirit and scope of the invention. All such modifications as would be obvious to one skilled in the art are intended to be included within the scope of the following claims.

What is claimed is:

1. A non-transitory computer-readable medium storing a print control program for controlling execution of a print job, the print job being shared among a main printing apparatus and one or more sub-printing apparatus(es), the main printing apparatus and one or more sub-printing apparatus(es) being connected to a computer through a communication line, the print control program allowing a computer to function as:
   a print requesting section for requesting the main printing apparatus and the sub-printing apparatus(es) to execute the print job in a cooperative manner;
   an apparatus information acquiring section for acquiring an apparatus information;
   an instruction determining section for determining shares of the print job respectively assigned to the main printing apparatus and the sub-printing apparatus(es) based upon the acquired apparatus information;

a controlling section for generating control instructions to be transmitted to the main printing apparatus and the sub-printing apparatus(es) respectively, the control instructions respectively allowing communications between the computer and each of the main printing apparatus and the sub-printing apparatus(es), the control instructions being for controlling the execution of the print job, wherein the apparatus information acquiring section acquires the apparatus information that is related to the printing capabilities of the main printing apparatus and sub-printing apparatus(es) and is stored in advance in the main printing apparatus as unified information; and an informing section for informing the user of a warning, wherein the main printing apparatus modifiably stores one or more destination(s) used in the transmission of the control instruction(s) to the sub-printing apparatus(es), the print requesting section makes a plurality of requests for the print job, the apparatus information acquiring section further acquires the destination(s) from the main printing apparatus as apparatus information, each time the request for the print jobs are made, and when the acquired destination is modified from the destination acquired upon request for the previous print job, the informing section informs that the destination is changed and displays a screen requesting a user input to confirm whether or not the user intends to continue the print job, and further wherein the control instruction to be transmitted to the main printing apparatus and the control instruction(s) to be transmitted to the sub-printing apparatus(es) are each composed of a sequence of instructions including an instruction for printing preparation and are transmitted thereto intermittently, and after the controlling section causes the communication section to transmit the instructions for printing preparation to the main printing apparatus and the sub-printing apparatus(es) respectively, the controlling section causes the communication section to transmit succeeding instructions, included in the respective sequences of instructions, to the main printing apparatus and the sub-printing apparatus(es) respectively, and each instruction for printing preparation is an instruction that causes the main printing apparatus or the sub-printing apparatuses to return from a power saving mode to a printing standby mode, the instruction facilitating start-up of the print job.

2. A print control unit for execution of a print job, the print job being shared among a main printing apparatus and one or more sub-printing apparatus(es), the print control unit being connected to a main printing apparatus and one or more sub-printing apparatus(es) through a communication line, the print control unit comprising:

a program storing section for storing a print control program for controlling the execution of the print job;

a processing section for executing the stored print control program; and a communication section for allowing communication between the print control unit and each of the main printing apparatus and the sub-printing apparatus(es), wherein the print control program allows the processing section to function as:

a print requesting section for requesting the main printing apparatus and the sub-printing apparatus(es) to execute the print job in a cooperative manner;

an apparatus information acquiring section for acquiring an apparatus information;

an instruction determining section for determining shares of the print job respectively assigned to the main printing apparatus and the sub-printing apparatus(es) based upon the acquired apparatus information; and a controlling section for generating control instructions and causing the communication section to transmit the control instructions to the main printing apparatus and the sub-printing apparatus(es) respectively, the control instructions respectively allowing communications between the print control unit and each of the main printing apparatus and the sub-printing apparatus(es), the control instructions being for controlling the execution of the print job, wherein the apparatus information acquiring section acquires the apparatus information that is related to the printing capabilities of the main printing apparatus and sub-printing apparatus(es) and is stored in advance in the main printing apparatus as unified information; and an informing section for informing the user of a warning, wherein the main printing apparatus modifiably stores one or more destination(s) used in the transmission of the control instruction(s) to the sub-printing apparatus(es), the print requesting section makes a plurality of requests for the print job, the apparatus information acquiring section further acquires the destination(s) from the main printing apparatus as apparatus information, each time the request for the print jobs are made, and when the acquired destination is modified from the destination acquired upon request for the previous print job, the informing section informs that the destination is changed and displays a screen requesting a user input to confirm whether or not the user intends to continue the print job, and further wherein the control instruction to be transmitted to the main printing apparatus and the control instruction(s) to be transmitted to the sub-printing apparatus(es) are each composed of a sequence of instructions including an instruction for printing preparation and are transmitted thereto intermittently, and after the controlling section causes the communication section to transmit the instructions for printing preparation to the main printing apparatus and the sub-printinq apparatus(es) respectively, the controlling section causes the communication section to transmit succeeding instructions, included in the respective sequences of instructions, to the main printing apparatus and the sub-printinq apparatus(es) respectively, and each instruction for printing preparation is an instruction that causes the main printing apparatus or the sub-printing apparatuses to return from a power saving mode to a printing standby mode, the instruction facilitating start-up of the print job.

3. The print control unit of claim 2, wherein the control instruction to be transmitted to the main printing apparatus and the control instruction to be transmitted to the sub-printing apparatus(es) have a format in common.

4. The print control unit of claim 2, wherein the print job is composed of a plurality of sets of prints, and the instruction determining section determines the shares of the print job individually as one or more set(s) of prints.

5. The print control unit of claim 2, wherein the print job is composed of a plurality of pages, and the instruction determining section determines the shares of the print job individually as one or more page(s).

6. The print control unit of claim 2,
wherein the apparatus information acquiring section acquires information required for calculation of a ratio of the shares of the print job respectively assigned to the main printing apparatus and the sub-printing apparatus(es), and
the instruction determining section calculates the ratio based upon the acquired information and determines, in accordance with the calculated ratio, the shares of the print job assigned to the main printing apparatus and the sub-printing apparatus(es) respectively.

7. The print control unit of claim 6,
wherein the print requesting section requests the main printing apparatus and the plurality of sub-printing apparatuses to execute the print job in a cooperative manner,
the apparatus information acquiring section acquires information required for calculation of a ratio of shares of the print job respectively assigned to the plurality of sub-printing apparatuses, and
the instruction determining section calculates the ratio based upon the acquired information and determines, in accordance with the calculated ratio, the shares of the print job assigned to the plurality of sub-printing apparatuses.

8. The print control unit of claim 2, further comprising:
an authentication data inputting section for requesting a user to input authentication data used for allowing the main printing apparatus and the sub-printing apparatus(es) to execute the print job, and for allowing the user to input the authentication data; and
an authentication data adding section for adding the input authentication data to the control instructions to be transmitted to the main printing apparatus and the sub-printing apparatus(es).

9. The print control unit of claim 2, further comprising a structure information requesting section for allowing a user to request structure information relating to optional device(s) installed in each of the main printing apparatus and the sub-printing apparatus(es),
wherein the main printing apparatus modifiably stores one or more destination(s) used in the transmission of the control instruction(s) to the sub-printing apparatus(es), and the apparatus information acquiring section further acquires the structure information of the optional device(s) in response to the request from the structure information requesting section, and also acquires the destination(s) to the sub-printing apparatus(es) from the main printing apparatus.

10. The print control unit of claim 2, further comprising a status monitoring section for monitoring the status of each of the main printing apparatus and sub-printing apparatus(es),
wherein the main printing apparatus modifiably stores one or more destination(s) used in the transmission of the control instruction(s) to the sub-printing apparatus(es), and the apparatus information acquiring section further acquires the destination(s) to the sub-printing apparatus(es) from the main printing apparatus, and
the status monitoring section monitors the status of the sub-printing apparatus(es) corresponding to the acquired destination(s).

11. The print control unit of claim 10,
wherein after the request by the print requesting section for the print job, the status monitoring section monitors the status of each of the main printing apparatus and the sub-printing apparatus(es) until the control instructions have been transmitted to the main printing apparatus and the sub-printing apparatus(es) respectively, and
the controlling section suspends the transmission of one of the control instructions to one of the main printing apparatus and sub-printing apparatus(es) when the apparatus has a trouble in conducting its share of the print job, and resumes the transmission after the restoration from the trouble.

12. The print control unit of claim 11, wherein
after the request for the print job by the print requesting section, the status monitoring section monitors the status of each of the main printing apparatus and the sub-printing apparatus(es) until the control instructions have been transmitted to the main printing apparatus and the sub-printing apparatus(es) respectively, and
the instruction determining section determines to allow another one of the main printing apparatus and sub-printing apparatus(es) to conduct, in place of the apparatus which has a trouble, the share of the print job assigned to the apparatus which has a trouble, based upon the results of monitoring of each of the main printing apparatus and sub-printing apparatus(es).

13. The print control unit of claim 2, connected to the main printing apparatus and the sub-printing apparatuses through the communication line, the print control unit further comprising a selection-prohibited apparatus specifying section for allowing a user to specify among the sub-printing apparatuses a sub-printing apparatus as a selection-prohibited apparatus,
wherein the print requesting section requests the print job to the respective printing apparatuses except for the sub-printing apparatus specified as the selection-prohibited apparatus, the instruction determining section determines shares of the print job assigned to the respective printing apparatuses except for the selection-prohibited apparatus, and the controlling section generates the control instructions to be transmit the control instructions to the respective printing apparatuses except for the selection-prohibited apparatus.

14. The print control unit of claim 13, wherein the selection-prohibited apparatus specifying section allows a specific user to specify the sub-printing apparatus by user authentication.

15. A method for executing a print job, the print job being shared among a main printing apparatus and one or more sub-printing apparatus(es), the main printing apparatus and one or more sub-printing apparatus(es) being connected to a computer through a communication line, the method comprising the steps of:
requesting the main printing apparatus and the sub-printing apparatus(es) to execute the print job in a cooperative manner;
acquiring an apparatus information;
determining shares of the print job respectively assigned to the main printing apparatus and the sub-printing apparatus(es) based upon the acquired apparatus information;
generating control instructions, the control instructions respectively allowing communications between the print control unit and each of the main printing apparatus and the sub-printing apparatus(es), the control instructions being for controlling the execution of the print job; and transmitting the control instructions to the main printing apparatus and the sub-printing apparatus(es) respectively, wherein the apparatus information is information related to the printing capabilities of the main printing apparatus and the sub-printing apparatus(es) and is stored in advance in the main printing apparatus as unified information; and informing the user of a warning, wherein the main printing apparatus modifiably stores one or more destination(s) used in the transmission of the control instruction(s) to the sub-printing apparatus(es), requesting a plurality of requests for the print job, further acquiring the destination(s) from the main printing apparatus as apparatus information, each time the request for the print jobs are made, and when the acquired destination is modified from the destination acquired upon request for the previous print job, informing that the destination is changed and displaying a screen requesting a user input to confirm whether or not the user intends to continue the print job, and further wherein the control instruction to be transmitted to the main printing apparatus and the control instruction(s) to be transmitted to the sub-printing apparatus(es) are each composed of a sequence of instructions including an instruction for printing preparation and are transmitted thereto intermittently, and after the controlling section causes the communication section to transmit the instructions for printing preparation to the main printing apparatus and the sub-printing apparatus(es) respectively, the controlling section causes the communication section to transmit succeeding instructions, included in the respective sequences of instructions, to the main printing apparatus and the sub-printing apparatus(es) respectively, and each instruction for printing preparation is an instruction that causes the main printing apparatus or the sub-printing apparatuses to return from a power saving mode to a printing standby mode, the instruction facilitating start-up of the print job.

16. The method according to claim 15, wherein the step of generating control instructions is the step of generating a plurality of sequences of instructions, the sequences of instructions constituting the control instructions respectively, and the step of transmitting the control instructions includes the steps of:

storing the generated instructions;

transmitting the stored instructions in such a manner that the instructions of each sequence are successively transmitted while keeping track of how many instructions of each sequence having been transmitted.

17. The method according to claim 15, wherein each of the steps is carried out under a multitask environment in which one or more thread(s) are generated, assigned for carrying out the steps, and executed in a non-sequential manner, each control instruction is composed of a sequences of instructions, the step of transmitting the control instructions to the main printing apparatus and the sub-printing apparatus(es) respectively is carrying out within a plurality of threads, each thread being assigned to the respective apparatuses and executing transmission of the sequence of the instruction to the corresponding apparatus intermittently.

* * * * *